Jan. 16, 1934.  B. A. PROCTOR  1,944,035
FILM HANDLING APPARATUS
Filed Jan. 14, 1929  6 Sheets-Sheet 5
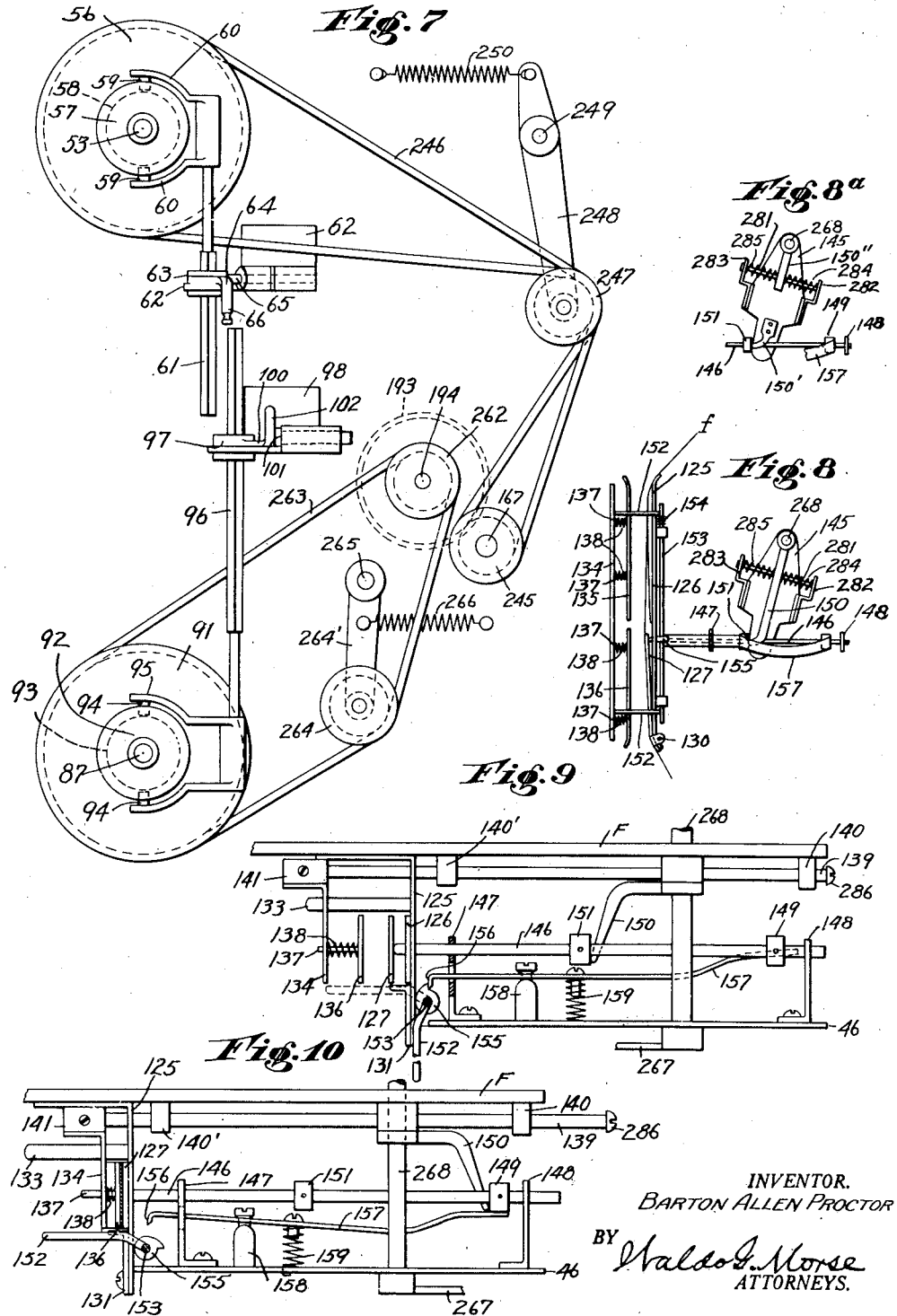
INVENTOR.
BARTON ALLEN PROCTOR
BY Waldo J. Morse
ATTORNEYS.

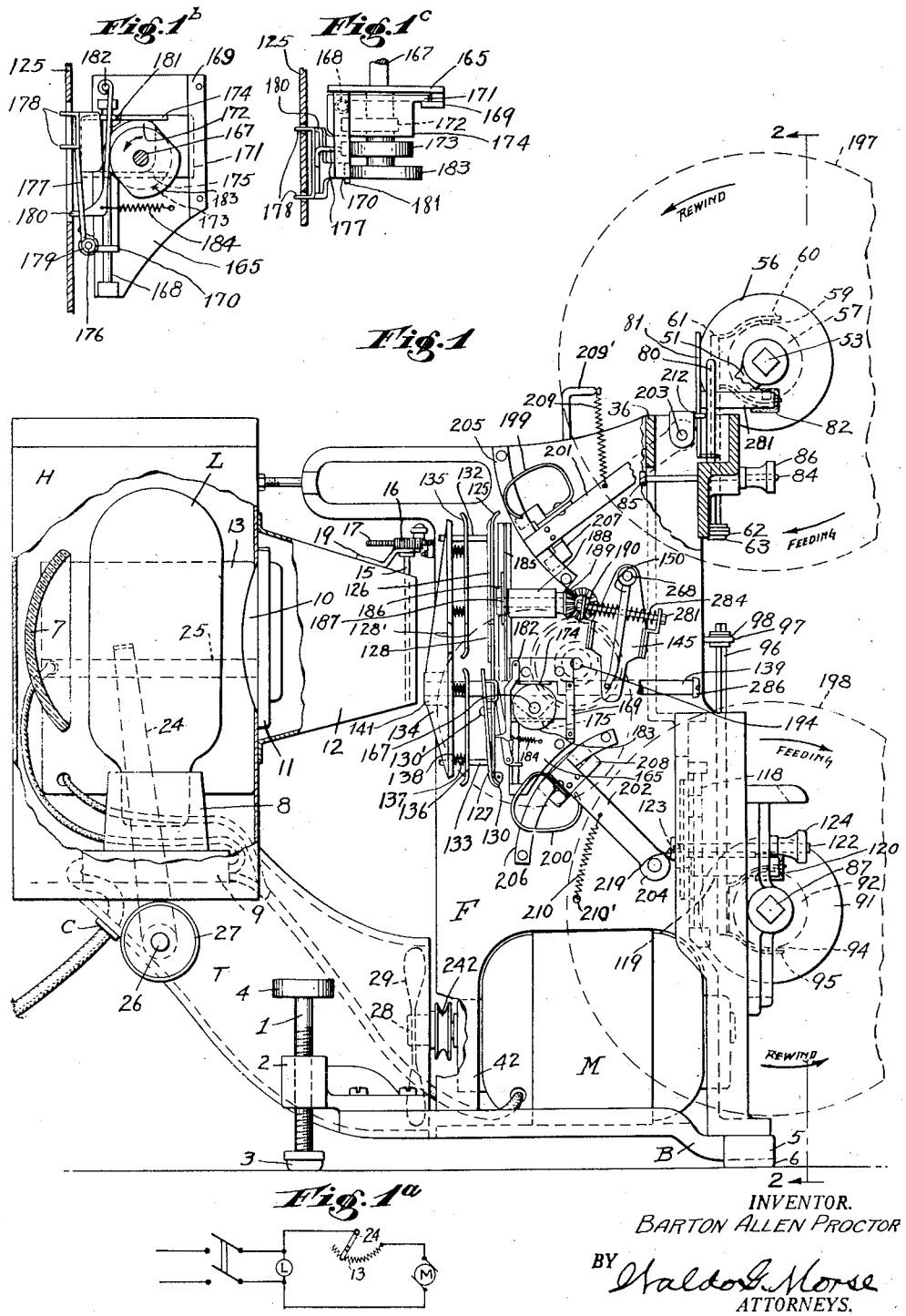

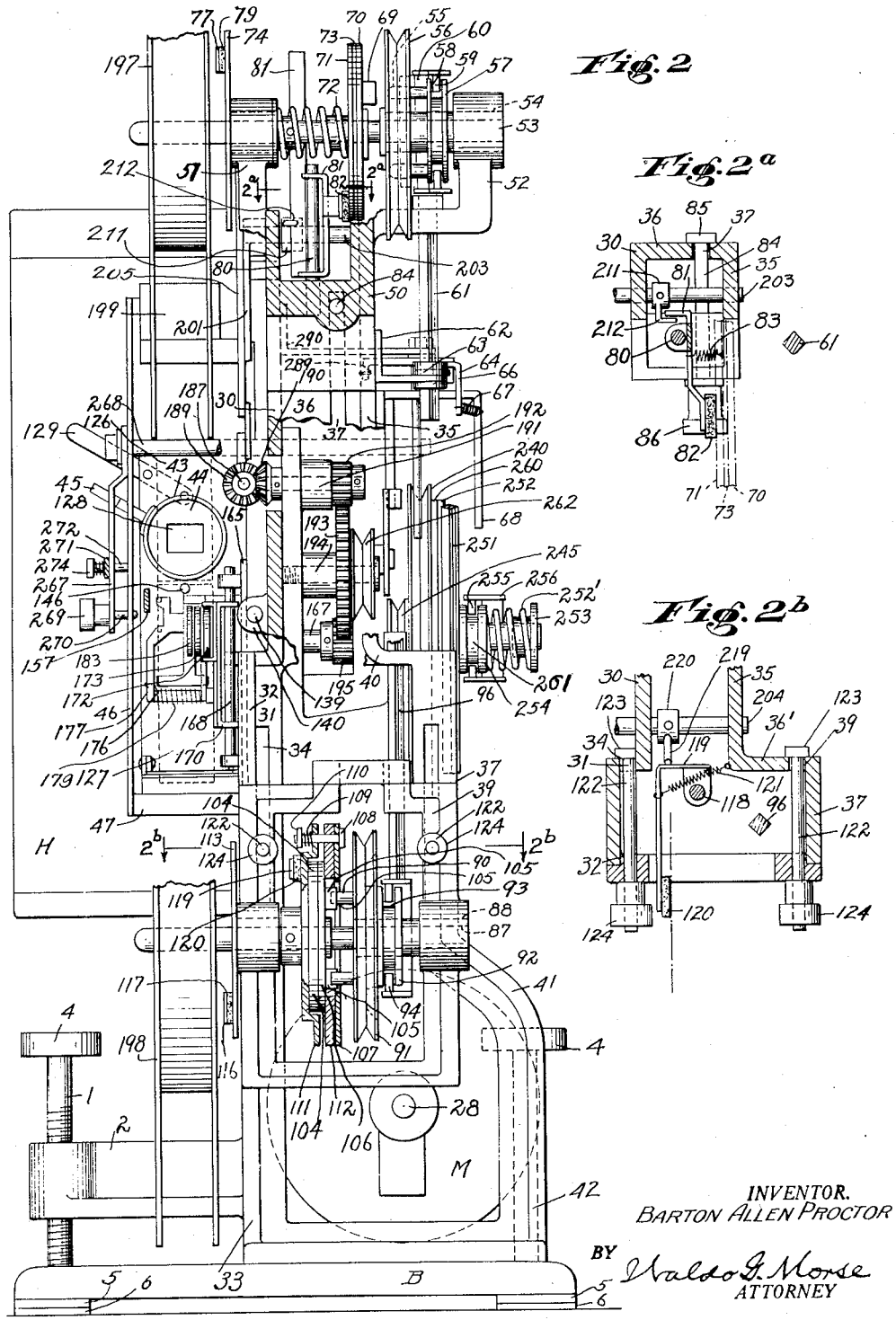

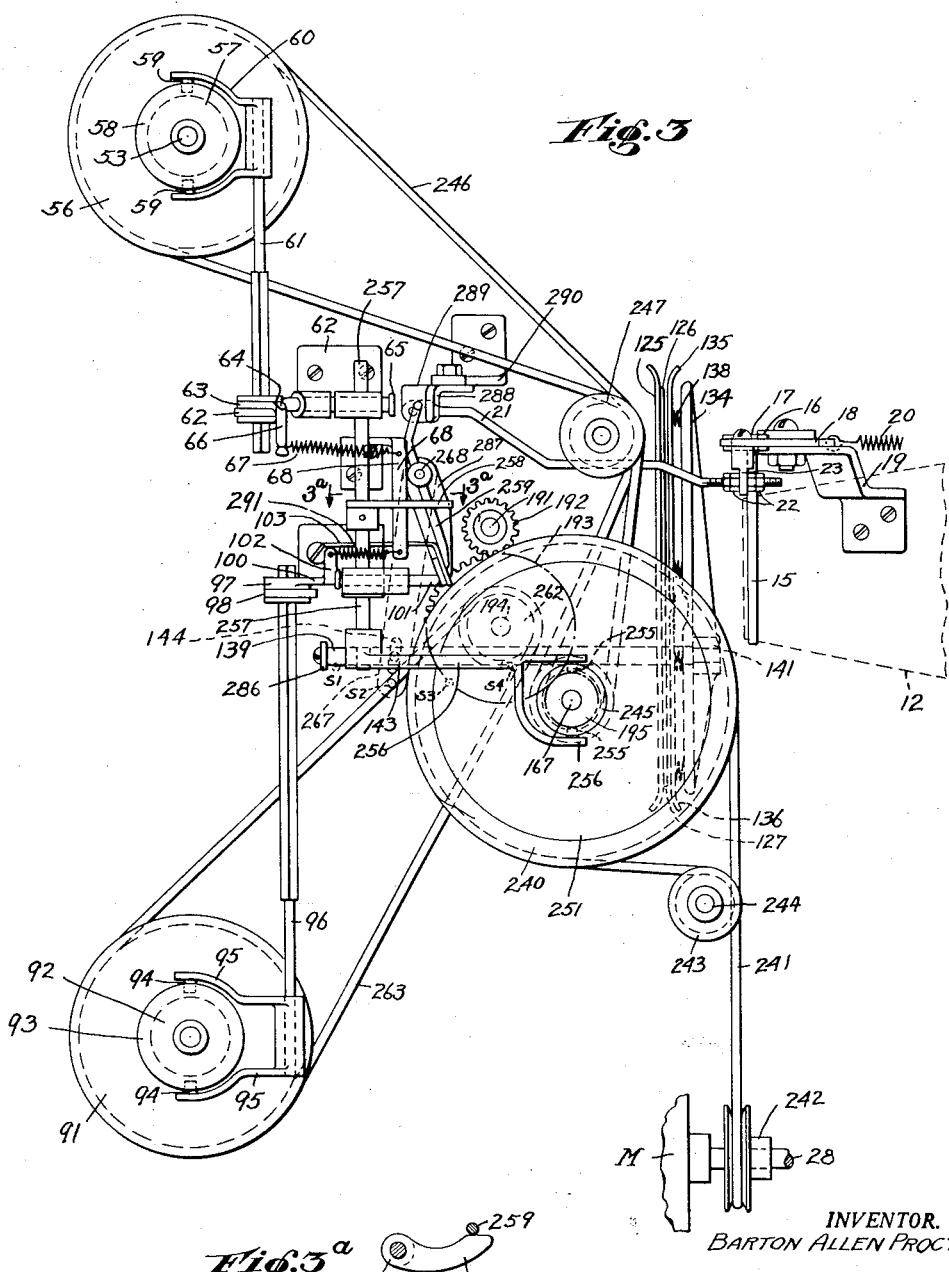

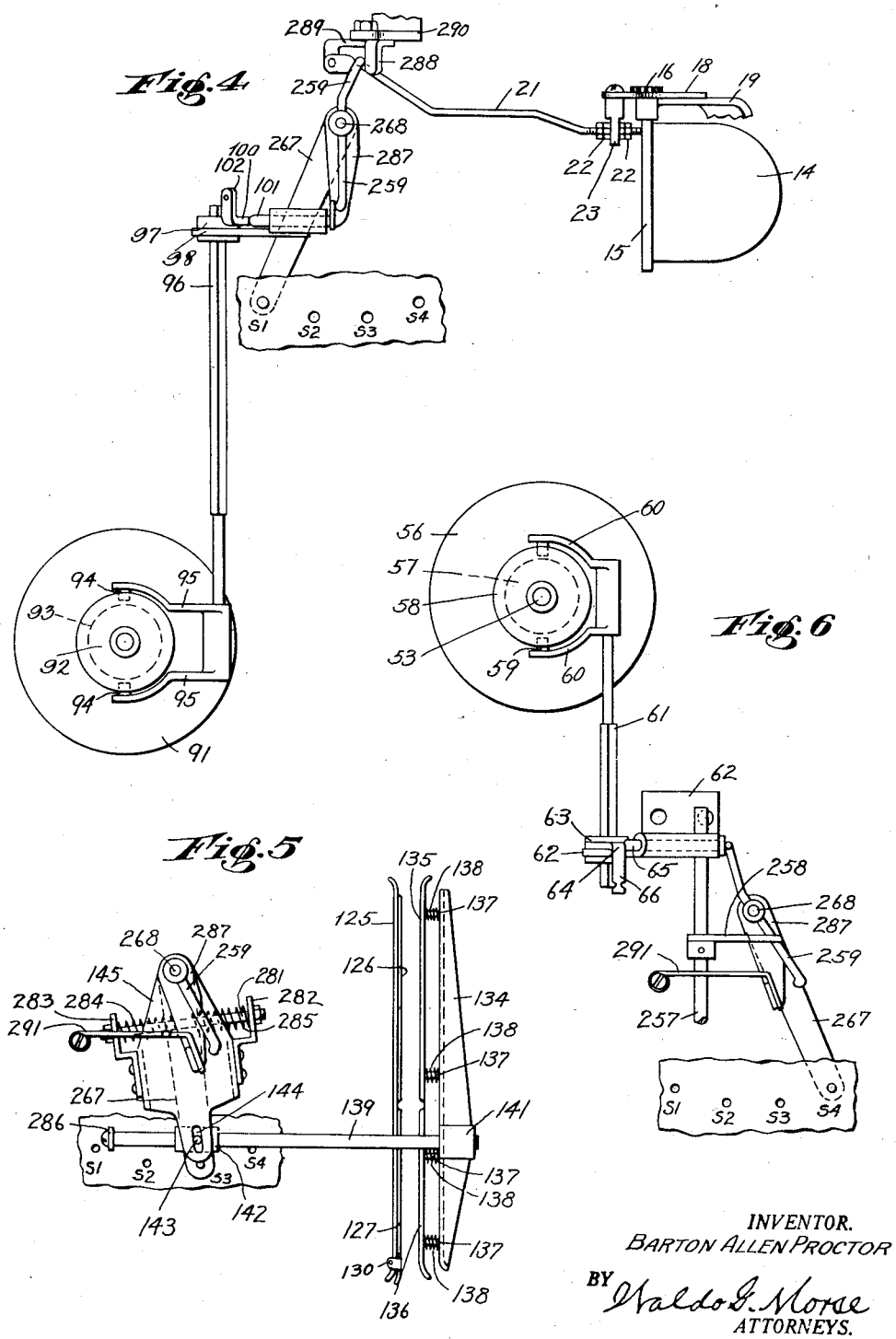

Jan. 16, 1934.   B. A. PROCTOR   1,944,035
FILM HANDLING APPARATUS
Filed Jan. 14, 1929   6 Sheets-Sheet 6
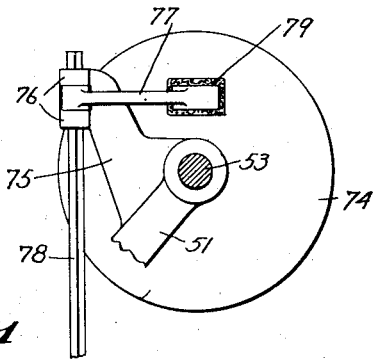
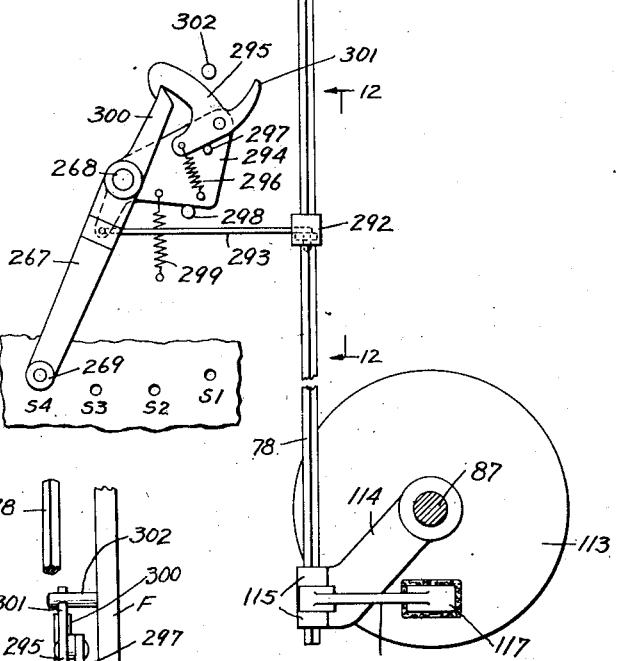
INVENTOR.
BARTON ALLEN PROCTOR,
BY Waldo G. Morse
ATTORNEYS.

Patented Jan. 16, 1934

1,944,035

UNITED STATES PATENT OFFICE 1,944,035

FILM HANDLING APPARATUS

Barton Allen Proctor, Pelham Manor, N. Y., assignor, by mesne assignments, to Kinatome Patents Corporation, New York, N. Y., a corporation of New York Application January 14, 1929. Serial No. 332,296

63 Claims. (Cl. 88—17)

The present invention relates broadly to the art of photography and more particularly to improvements in apparatus adapted for the handling of films, whether for the projection of pictures in motion, or for the repetitious projection of still pictures or for the taking of pictures in motion or of still pictures or for the reproduction or recordation upon films of images representing sound, as in film playing phonographs, or for the reproduction or recordation of such images in conjunction with visual images. It will readily be understood, however, that the present invention is applicable to many other uses.

My invention provides simple and effective means for the automatic threading of the film handling apparatus without the laborious and difficult manipulation which is required by previous types. In apparatus constructed according to the present invention, the user merely places the film in the gate, and the mechanism without damage to the film correctly positions it in all planes and also in cooperative relation to the driving means, and automatically creates and maintains the conditions of tension which are necessary for proper operation.

According to one preferred form of my invention, when the gate of the apparatus is opened, the teeth of the moving and retaining means are completely protected, and the film channel is free from obstruction. After the user places the film in or about the channel of the gate, he moves the one lever which controls all the operations of the projector and thereby operates mechanism which correctly positions the film in all planes, closes the gate, places the film in operative position relative to the teeth of the moving means, actuates the take-up mechanism which completely and automatically positions the perforations of the film in driving relationship with such teeth, actuates the film moving means, actuates the film tensioning mechanisms, and withdraws the heat screen from protective relationship with the film. Thus by the mere placing of the film adjacent to the channel of the gate and the movement of one control lever the user places the apparatus in full operation. At any point in the cycle of operations, the user by the movement of the one control lever may project a still picture, the film being automatically protected from undue heat from the light source. By a further movement of the same unitary control means, the user may automatically open the gate, strip the film from the moving or retaining teeth, protect it therefrom, and rewind it, the film being at all periods completely protected from lateral movement out of the gate and against undue heat from the light source. At the conclusion of the rewinding operation, as the user automatically opens the gate by the movement of the one control lever, braking mechanism automatically checks the momentum of the re-winding and take-up reels and prevents damage to the film. In apparatus constructed according to my invention, because of the protective means above stated, it has been found entirely practicable to re-wind the film without damage at over 50 times the speed with which it was projected. Thus it is practicable to rewind a film the projection of which normally requires 16 minutes in less than 20 seconds.

In other film handling apparatus, the teeth of the film moving or retaining means are left exposed, since the user must thread the film upon these teeth, carefully place each perforation upon its appropriate tooth and clamp it into such position, and must provide the necessary unsupported loops of slack film by manual adjustments requiring skill, care and time.

According to another form of my invention, the teeth for moving the film are left exposed while the gate is open, means for removing the film from such teeth being effective prior to the rewinding operation and means protecting the film from such teeth being effective during such rewinding operation.

The invention contemplates the use of improved film moving means and film retaining means, preferably in the form of teeth cooperating with the film in the gate, in order to give to the film the intermittent motion required to bring successive portions into operative position and to hold the film in proper registration for projection or exposure.

An object of my invention is the provision of adjustable apparatus of such characteristics that it can be made immediately available for use with film carriers of different characteristics and of different dimensions accommodating films of different lengths, as, for example, films of 16 millimeters in width of from 100 to 400 feet in length. For such short films as are exposed by amateur photographers or purchased from so-called film libraries, double magazines have been found effective. Such double magazines, or single magazines of similar capacity, have also been found effective for films bearing thereon records representing sound. Films of relatively greater length may be used with such protective magazines, generally of relatively larger diameter, as those described and claimed in my co-pending application Serial Number 332,879 filed January 16, 1929, which is a divisional application from my co-pending application Serial Number 54,910, filed September 8, 1925. It has been found that protective magazines of various types assist in the simple and automatic threading of the film as well as in its protection during use, shipment and storage.

Dramatic films, such as are ordinarily rented from such film libraries, are generally wound upon open reels of seven inches or more in diameter accommodating 400 feet of 16 millimeter film, and they often require for effective operation spindles in relatively greater spaced relationship to each other than those required by magazines, and different types of magazines may require spindles of different center distances therebetween. Consequently my invention provides a re-winding spindle and a take-up spindle, together with the necessary controlling and driving mechanisms therefor, each of which is axially movable relatively to the other along its appropriate track upon the apparatus, and each of which is a complete unit which is fully operative irrespective of its position. Thus, for example, the user instantly can make apparatus constructed according to my invention available for use with a magazine of 100 foot capacity after he has projected the library film carried by an open seven inch reel of 400 foot capacity.

Another object of my invention is the provision of improved means preventing the user from attempting to insert a film in the path of light after the means employed to reduce the heat reaching the film has become ineffective and to prevent the user from attempting to place a film in operative relationship with the film moving means after the same has been started in operation.

Another object of my invention is the provision of means correctly positioning the film in relation to all moving elements within the gate before movement can be imparted to such film, locking it within the gate after movement has begun, and locking it therein during the re-winding period. Another object of my invention is the provision of braking means effective upon the film carrying means after the conclusion of the re-winding operation.

Another object of my invention is the provision of improved means whereby the apparatus can be controlled in the manner desired.

Another object of my invention is the provision of simplified and improved construction of the operating elements of the apparatus. Among the objects of my invention is the construction of the various parts of the apparatus such as the film moving and retaining mechanisms, the re-winding spindle and its associated parts, the take-up spindle and its associated parts, as complete units whereby the same may be readily assembled in operative relationship with the rest of the mechanism or removed therefrom for repair or replacement.

My invention provides a new and improved construction of the gate and the control mechanism therefor including means effective to remove the film from the feeding and retaining fingers and to protect it therefrom. My invention also includes among its objects new and improved means for actuating the heat shield effective to protect the film during predetermined cycles of the operation of the mechanism.

Another object of my invention is to provide film handling mechanism so designed as to be noiseless in its operation, since virtually silent operation is demanded in an instrument which reproduces or records sound.

My invention not only provides automatic easy and efficient means for placing the apparatus in full operation and in all ways controlling it in the manner desired, but also it accomplishes this result with a small number of parts, all of which under modern manufacturing conditions can be cheaply made and assembled.

It will be readily understood that while my invention is particularly useful when applied to apparatus designed for the use of amateurs as in homes or schools, it can be applied equally well to apparatus designed for professional and commercial use as in theatres.

Other objects, advantages and characteristics are apparent from the following description, the attached drawings and the subjoined claims. Although I am showing but one embodiment of my invention, it will readily be understood that I am not limited to one construction as changes can readily be made without departing from the spirit of my invention or the scope of my broader claims.

It will be readily understood by those skilled in the art that my invention applies to film handling apparatus generically and in most respects equally well to either a camera, film playing phonograph, projector or so-called talking motion picture apparatus, although in the following description I give as an example of my invention its embodiment in a projector.

Certain features of the present invention are embodied in my copending application Serial Number 54,910, filed September 8, 1925, and Serial Number 187,980, filed April 30, 1927, and in the copending application of Clarkson Ulysses Bundick and myself, Serial Number 44,482, filed July 18, 1925.

In the drawings:

Figure 1 is a right side elevation, certain parts of the lamp housing being broken away, and certain details being omitted for clarity. Figure 1A is a diagram showing the electrical wiring of the apparatus. Figure 1B is a right side enlarged elevation of the film moving and retaining elements. Figure 1C is a top plan view of the same.

Figure 2 is a cross section of the apparatus in projection position taken upon the line 2—2 of Figure 1, certain parts being omitted for clarity. Figure 2A is a detail plan view taken in the direction shown by the arrows along the line 2a—2a of Figure 2. Figure 2B is a detail plan view taken in the direction shown by the arrows along the line 2b—2b of Figure 2.

Figure 3 is a partial left side elevation of the apparatus in the single picture position. Figure 3A is a partial plan view taken in the direction indicated by the arrows along the line 3a—3a of Figure 3.

Figure 4 is a partial left side elevation of the apparatus in projection-in-motion position showing the fire shutter and take up spindle control.

Figure 5 is a partial left side elevation of the gate of the apparatus in film threading position.

Figure 6 is a partial left side elevation of the apparatus in film rewinding position.

Figure 7 is a partial left side elevation of the apparauts in film rewinding position with the spindles in relatively close position to accommodate carriers of relatively small capacity.

Figure 8 is a right side partial view showing the gate and a portion of the control mechanism for certain parts associated with the gate. Figure 8A shows a preferred modification of a portion of such control mechanism.

Figure 9 is a partial top plan view of the gate and lateral positioning fingers and a portion of the control mechanism in a film threading position.

Figure 10 is a partial top plan view of the gate and positioning members and a portion of the control mechanism in still picture projection position or in projection-in-motion position.

Figure 11 is a partial right side elevation showing in skeleton form the re-winding braking mechanism and the portion of the control mechanism adapted to operate the same, the apparatus being in film-rewinding position.

Figure 12 is a view taken in the direction shown by the arrows along the line 12—12 of Figure 11.

In carrying out the present invention, there may be provided an apparatus having a supporting base B having mounted thereon a ventilating tunnel T and a supporting frame F.

Adjusting legs 1 threaded as through the lugs 2 projecting from the rear of the base B may be provided whereby the optical axis of the apparatus may be raised or lowered at will in order to place the picture upon a screen as desired. The bottoms of the adjusting screws may be provided with rubber or other suitable pads 3 in order to avoid scratching the surface upon which the apparatus may be placed and to minimize noise, and the tops of the screws may be provided with knurled heads 4 for easy adjustment. The forward feet 5 of the apparatus may likewise be provided with pads 6 of rubber or of some other suitable protective material.

Upon the top of the air tunnel T, there may be mounted a housing H which may contain the mirror or other suitable reflecting surface 7, the light source L in the socket 8 supported as by the plate 9, the condensing lens 10 positioned as within the holder 11, the forwardly facing cone 12, and the motor resistance 13. The cone will be effective to prevent the escape of objectionable light rays. In order to protect the film while stationary in the gate from the heat of the light source, a heat screen 14, composed of fine wire mesh, or other suitable material, may be mounted within the cone 12 as upon the rotatable rod 15. To the upper portion of this rod there may be pinned the gear 16 which meshes with the arcuate rack 17 formed in the plate 18 which may be pivoted for movement as upon the bracket 19 extending from the cone 12. In order normally to position and hold such a screen in the closed or light intercepting position within the mouth of the cone, a spring 20 may be attached to the plate 18 and the lamp housing H. In order that the screen may be moved from such position to allow the full light to pass through the film while in motion, a screen control rod 21, subject to adjustment as by the nuts 22 threaded upon the rearward end thereof, may be attached as to the extension 23 of the plate 18. Mechanism for moving this rod in timed relation to the actuation of other portions of the apparatus will later be described.

Within the housing H, there may be positioned the motor resistance 13 attached as to the back wall thereof. The wiper arm 24, which is effective to form contact between the bar 25 and the wires of the resistance, may be controlled as by the rod 26, the knob 27 of which may be conveniently positioned as below the door which may be formed in the side of the housing.

The top of the lamphouse may be constructed with louvres to permit the escape of heated air and be readily removable.

Upon the rearward end of the armature shaft 28 of the motor M, which may be mounted as upon the base B, there may be provided the fan 29, so positioned as to revolve within the mouth of the ventilating tunnel and to force air upwardly therethrough.

It will thus be readily understood that all parts of the apparatus which generate heat are positioned directly over the end of ventilating or air tunnel and subjected to the full force of the air blown therethrough. Moreover, such a tunnel, which may be cast or formed in one piece, furnishes a simple and sturdy support for the housing and the parts within it and carried thereby.

As clearly shown in Figure 1, the feed wires may be attached to such tunnel by an appropriately insulated connection C and be brought therewithin, the resistance, lamp and practically speaking all of the motor wiring being within tunnel or lamphouse, thus providing further safe guard.

Figure 1A is a wiring diagram of the apparatus.

Upon the main frame F, likewise supported as by the base B, there may be positioned the objective lens and the general operating mechanism of the apparatus, including the rewinding spindle carriage, take-up spindle carriage, gate, lateral positioning means, film moving and retaining means, shutter, tension control mechanisms, rewinding brake, automatic control, and associated parts. Such frame may be constructed in any appropriate fashion, as for example, as follows:

As is clearly shown in Figures 2, 2A and 2B of the drawings the forward portion of the main frame F may be constructed in a form which includes substantially parallel plates 30 and 35 which with the extensions thereto form the tracks upon which the rewinding spindle carriage and the take-up spindle carriage respectively may be moved. The lower section of the main or left hand of these plates 30 as viewed in Figure 2B of the drawings may include a right angled extension 31 to its main body portion and a second right angled forwardly facing extension 32 to said first mentioned extension, this second extension terminating downwardly in a leg 33 attached to the base B. In this first mentioned extension 31 there may be provided a slot 34 for co-action with a positioning rod of the take-up spindle carriage. The upper section of the secondary or right hand plate 35 as viewed in Figure 2A of the drawings, may consist of a right angled extension 36 joining it to the main body portion of the main plate 30. In this extension, there may be provided a slot 37 for co-action with the positioning rod of the rewind spindle carriage. The lower section of such secondary or right hand plate 35 as viewed in Figure 2B of the drawings, may be of any appropriate construction whereby the take-up spindle track may be formed, together with means for the reception of the take-up spindle carriage positioning rod and support by the main frame. For example, such lower section may consist of members 36' and 37: a forward member 37 which forms the right hand section of the take-up spindle track, as viewed in Figure 2B of the drawings, and a rear supporting member 36' joining the forward section to the lower section of the main plate 35, in such supporting member 36' there being formed a slot 39 for the reception of the take-up spindle carriage positioning pin. Said lower section of the plate 35 may be joined to the upper section thereof as by a shoulder 40 and may terminate downwardly in an appropriately shaped leg 41 attached to the base B. It will be understood that the rewinding spindle carriage tract is formed directly by the forward surfaces of plates 30 and 35 and the take-up spindle carriage track of more widely spaced forward extensions 32 and 37 thereof.

The lower rear portion of the main plate, may terminate in the supporting leg 42 attached to the base B.

It will be readily understood that such frame F may be constructed of one sand casting or one die-casting or two stampings appropriately fastened together or in some other suitable manner.

Projecting at right angles from the left main portion of said main frame as viewed in Figure 2 of the drawings may be positioned the lens carrier 43 in which the objective lens 44 is inserted, means to move said lens to focus the same being provided as by the focusing lever 45 which may project through the front operating shield 46, this shield being supported in spaced parallelism to the front main portion of the main frame as by attachment to the gate and as by the struts 47. It will, of course, be understood that said objective lens 44 will be placed in line with the aperture of the gate, which will later be described, condensing lens 10, light source L and mirror 7.

There may be provided a rewinding spindle carriage and a take-up spindle carriage, each of which is a self contained unit, each movable, along its respective track previously described, relatively to the other and to the optical axis of the apparatus, whereby the apparatus instantly may be made ready to accommodate reels or magazines of different diameters or capacities and each easily and completely removable from the apparatus as for repair, renewal, shipment or storage.

The rewinding spindle carriage may consist of a body portion, the rear of which is shaped to cooperate with the forwardly facing plates 30 and 35 which form the rewinding spindle carriage track. Projecting upwardly and forwardly therefrom there may be provided the arms 51 and 52 in which the rewinding spindle 53 may be suitably journalled for rotation, as within the bearing 54 in arm 52. The carrier mount portion of said spindle may be formed of any desired contour. To revolve said spindle in a re-winding direction, anti-clockwise as viewed in Figure 1, power may be applied through an operating clutch and a friction drive member, which may be of any desired construction.

The operating clutch, for example, may be constructed with pins 55 projecting to the left as viewed in Figure 2 through appropriate openings in the re-winding spindle pulley 56 from the collar 57 which embodies therein the annular depression 58 formed as for cooperation with the pins 59 extending inwardly thereinto from the fork 60 which may be formed at the extremity of the re-winding clutch control rod 61, the rewinding spindle pulley 56 being freely revoluble upon the outside portion of the bearing 54 within which the shaft 53 is revoluble. The ends of such pins 55 may be tapered to prevent interference with the driving block of the friction clutch, should both pin and block happen to be coaxial when the clutch is moved to operative position. As is clearly shown in Figure 3 such rod of non-circular cross section may extend downwardly as through an opening of similar cross section in a collar 63 mounted for rotation as upon the bracket 62 extending to the right as viewed in Figure 2 from the secondary plate 35 of the main frame F. A short lever 64 may extend from such collar whereby a bearing surface may be provided whereby the longitudinal movement of the rod 65 supported as by bracket 62 may rotate such collar and such rod. To a downwardly projecting extension 66 of such lever 64 a spring 67 may be provided, the opposite end of which may be attached as to the bracket 68 supported as by such secondary plate 35. Means, later described, may be provided to give longitudinal movement to said rod 65 in timed relation to the actuation of other operations of the apparatus.

For cooperation with the pins 55 of the clutch when moved to the left as viewed in Figure 2 of the drawings, a driving block 69, wedge shaped to prevent interference with the ends of the pins 55, may be provided extending as from the driving plate 70 of the friction driving element which may be loosely mounted as upon the shaft 53. To the left thereof, as viewed in Figure 2, there may be placed the driven plate 71, so mounted upon the shaft as to be longitudinally movable relatively thereto as urged to the right as by the spring 72 but to be revoluble therewith. Between such plates there may be positioned the friction disc 73 which may be constructed in any suitable manner, as of fibre, or of felt in accordance with the invention disclosed and claimed in my co-pending application, Serial Number 187,980, filed April 30, 1927.

It will be readily understood that when the rewinding spindle control rod 61 is rotated to the left as viewed in Figure 2 by the longitudinal movement of the rod 65 and the rotation of the collar 63 the pins 55 will project through the holes of the revolving pulley 56 and engage with the block 69 of the pulley thereby communicating movement through the friction pad 73 and the plate 71 to the re-winding spindle 53. When the rod 65 is permitted free movement, by means later described, the spring 67 will rotate said collar 63 and said re-winding spindle rod to the right as viewed in Figure 2 of the drawings and the pins 55 will be retracted from contact with the driving block 69 and the pulley 56 and the friction driving plate 70 will be entirely out of operative contact.

It will be also readily understood that if during the rewinding cycle the resistance to rotation of the material being wound upon the spindle exceeds a given point the friction clutch will slip and thus protect the film from undue strain.

The rewinding brake disc 74, coacting with the rewinding braking mechanism later described, may be mounted for revolution with the rewinding spindle 53. Attached to and movable with the rewinding spindle carriage may be provided the rewinding brake bracket 75 between the forked ends 76 of which the braking arm 77 is carried, always in cooperative relationship with the rewinding braking control rod 78 irrespective of the position of the rewinding spindle carriage along its track. Similarly the braking pad 79 is always in cooperative position relative to the disc 74.

If desired, a braking mechanism effective during the feeding cycle, the operation of which is later described, may be provided to cooperate with the rewinding spindle 53, as is clearly shown in Figures 2 and 2A. The rod 80 may be mounted in any appropriate fashion upon the rewinding spindle carriage. Pivotally mounted upon such rod, the plate 81 may be provided, one section of which may be adapted to coaction with the rewinding spindle brake hook 212, later described, and another section of which substantially at right angles to such former section may be elongated to provide a brake-arm to the forward end of which is attached the brake pad 82 adapted to bear against the driven plate 71 which may be pinned to the rewinding spindle 53 for rotation therewith. A spring 83 may be provided to urge the brake pad 82 against the disc 71.

In order to hold the re-winding spindle carriage in any desired position along the re-winding spindle carriage track there may be provided the positioning rod 84 which may project rearwardly through the slot 37 and be terminated in a head 85. The forward portion of such rod may be threaded and provided with a knurled thumb nut 86 which when tightened will be effective to draw the head of the rod against the plate 36 and so retain the carriage in any desired position.

The take-up spindle carriage, spindle, clutch and friction driving element may be constructed similarly or in any appropriate manner.

The take-up spindle carriage may consist of a body portion so constructed as to cooperate with the forwardly facing plates 32 and 37 which form the rewinding carriage track. The take-up spindle 87, the carrier mount portion of which may be formed of any desired contour, may be suitably journalled for rotation within the side members, as within the bearing 88 in the right side member, as viewed in Figure 2. To revolve such spindle in a feeding direction, clockwise as viewed in Figure 1 power may be applied as through an operating clutch and a friction driving element.

The operating clutch for example may be constructed as with pointed pins 90 projecting to the left as viewed in Figure 2 of the drawings through appropriate openings in the take-up spindle pulley 91 from the collar 92 which embodies therein the annular depression 93 formed as for cooperation with tapered clutch fingers 94 extending inwardly thereinto from the fork 95 which may be formed at the extremity of the take-up clutch control rod 96, the take-up spindle pulley being freely revoluble upon a portion of the outside of the bearing 88 within which the shaft 87 revolves. Such rod may extend upwardly, and terminate in a non-circular cross section extending through an opening of similar cross section in a collar 97 mounted for rotation as upon the bracket 98 extending to the right as viewed in Figure 2 from the secondary plate 35 of the main frame. A short lever 100 may extend from such collar whereby a bearing surface may be provided whereby the longitudinal movement of the rod 101 supported as by such bracket 98 may rotate such collar and such rod. To an upwardly projecting extension 102 of such lever 100 a spring 103 may be attached, the opposite end of which being attached as to the bracket 68. Means, later described, may be provided to give longitudinal movement to such rod in timed relation to the actuation of other operations of the apparatus.

The friction driving element may be constructed in any desired manner, as, for example, as follows: For cooperation with the pointed pins 90, a driving disc 104 may be provided, loosely mounted as upon the take-up shaft 87. The right hand surface of such disc, as viewed in Figure 2, may be serrated or formed with a succession of closely spaced, wedge shaped teeth 105, whereby when such driving pins 90 are moved to the left, as viewed in Figure 2, they form immediate driving contact. A friction surface 106 of suitable material may be provided upon the outer or right hand portion of such disc as viewed in Figure 2 to form frictional contact as with the friction surface 112 of the driven annulus 107, connected as by the screws 108, provided upon their outer ends with compression springs 109, the tension of which may be regulated as by the nuts 110, to the driven disc 111 which is pinned to the shaft 87 for revolution therewith.

It will be readily understood that when the take-up spindle control rod 96 is rotated to the left, as viewed in Figure 2, by the longitudinal movement of the rod 101 and the rotation of the collar 97, the pins 90 will project through openings in the pulley 91 and the driven annulus 107 and come into driving contact with the teeth 105 of the driving disc 104, power thus being immediately applied from the pulley 91 to revolve the take-up shaft 87 through the friction surfaces 106 and 112 and the driven annulus 107 and the driven disc 111. When the rod 101 is permitted free movement, by means later described, the spring 103 will rotate such collar 97 and such take-up spindle control rod 96 to the right as viewed in Figure 2 of the drawings. It is apparent that the pins 90 will thus be retracted from contact with the driven disc 104 and the friction driving element will be entirely out of operative contact with the pulley 91.

It will be understood by those skilled in the art that the provision of yieldingly driven means for revolving the take-up spindle is necessary in order to compensate for the constantly changing diameter of the mass of film upon the take-up spindle as feeding progresses. Slippage can be regulated at will by changing the tension upon the compression springs 109.

As is clearly shown in Figure 11, the rewinding brake disc 113, coacting with the rewinding braking mechanism later described, may be mounted for revolution with the take-up spindle. Attached to and movable with the take-up spindle carriage may be provided the rewinding brake bracket 114 between the forked ends 115 of which the braking arm 116 is carried, always in cooperative position relative to the rewinding braking control rod 78 irrespective of the position of the rewinding spindle carriage along its track. Similarly the braking pad 117 is always in cooperative position relative to the disc 113.

As is clearly shown in Figure 2B, braking mechanism, similar in construction to that already described as effective upon the rewinding spindle, may be provided, if desired, to cooperate with the take-up spindle 87 during the feeding cycle. The rod 118 may be mounted in any appropriate fashion upon the take-up spindle carriage. Pivotally mounted upon such rod 118, the plate 119 may be provided, one section of which is adapted to coaction with the rewinding spindle brake-hook 219 later described, and another section of which is elongated to provide a brake-arm to the forward end of which is attached the brake pad 120 which is adapted to bear against the driven plate 111 which may be pinned to the take-up spindle 87 for rotation therewith. A spring 121 may be provided to urge the brake pad 120 against the plate 111.

In order to hold the take-up spindle carriage in any desired position along the take-up spindle carriage track there may be provided the positioning rods 122 which may project rearwardly through the slots 34 and 39 and be terminated in heads 123. The forward portions of such rods may be threaded and provided with knurled thumb nuts 124 which when tightened will be effective to draw the heads of the rod against the inner portions of the surfaces 31 and 36', and so retain the carriage in any desired position.

A film gate may be provided, intermediate the rewinding spindle and the take-up spindle and extending at right angles from the main frame F. The main plate 125 of the gate may be a right angled stamping attached to the frame F in any appropriate manner. Two front film track plates 126 and 127 may be attached thereto, the upper plate 126 bearing therein the aperture 128. In order to accommodate different types of film printing and to "frame" the picture as it is known in the motion picture art, such plate may be mounted so as to be movable substantially normally to the optical axis of the apparatus as by the framing handle 129. The lower front film track or stripper plate 127 may be pivoted as upon a mounting pin 130 for arcuate movement relative to the main gate plate, its movement away from the main gate plate being limited as by the headed pin 130' which may coact with an extension or suitable formation on such plate. This plate may be provided with openings through which the film moving and retaining fingers of the apparatus may operate so that it may serve as a film-path-defining gate section.

To form the outer limit of the film channel, there may be provided an adjustable plate 131 attached to the main plate 125 (Figure 10) or reliance may be placed upon the positioning fingers, later described. To limit the film channel inwardly there may be provided the two pins 132 and 133 which also serve in part as guiding members to guide the rear portion of the gate. Such rear portion may consist of a main rear section 134 which may serve as a mounting for two film pressure plates 135 and 136 coacting with the front film track plates 126 and 127 respectively, said pressure plates being carried by said rear section as upon pins 137 about which may be coiled compression springs 138. As will appear hereinafter the plates 135 and 136 serve as gate sections. The main rear section 134 and the upper pressure plate 135 may be formed with apertures 128' corresponding to the aperture 128 in the plate 126. The lower pressure plate 136 may be formed with openings corresponding to those in the stripper plate 127. The central portion of all of such plates which bear against the image-bearing portion of the film may be suitably relieved to prevent scratching, or the front plates 126 and 127 may be so relieved.

There may be provided the gate opening rod 139 which may pass through a suitable opening in the main gate plate 125 and be guided as by the brackets 140 and 140' projecting from the main frame F and be secured to the main rear gate section 134 as by the adjustment block 141, permanently secured to such rear gate section and movable along such rod 139 to any desired position. To secure the desired pressure upon the film in the gate, the entire rear section may thus be positioned at any suitable point along the rod 139 thus determining the effectiveness of the springs 138 when the gate is in closed position.

As is clearly shown in Figure 5, from the control block 142 secured to such rod may project the pin 143 co-acting with the slot 144 of the control saddle 145 whereby when such saddle is moved to the left as viewed in Figure 5, by means later described, longitudinal movement is communicated to the rear gate section and the gate is closed, and when said saddle is moved to the right, as so viewed, from station S2 to station S3, the gate is opened.

As is clearly shown in Figures 9 and 10, to move the stripper plate 127 upon the pivot 130, a stripping rod 146 may be provided, the left end of such rod, as viewed in Figure 9, passing through an opening in the gate section 125 and resting against the right hand or forward surface of the stripper plate. Such rod may be guided as by the main gate plate and by the brackets 147 and 148 attached to the front shield 46 and limited in respect to movement forwardly as by the block 149, attached to such rod, which may coact with the bracket 148. Longitudinal movement may be communicated to such stripper rod as by the movement of the control arm 150 to the left as viewed in Figure 9 of the drawings, the end of the control arm bearing against the control block 151 attached to the stripper rod. Means, later described, to move such control arm in timed relation to the actuation of other operations of the apparatus, may be provided. It will be readily understood that when the stripper plate is so moved it will remove a film f within the gate of the apparatus from the moving or retaining teeth of the apparatus and will protect it therefrom. It will also be understood that the point at which the block 151 is placed upon the rod 146 will time the operation of the stripper plate.

As the gate is closed by the movement of the rear sections, to the right as viewed in Figures 9 or 10, the control arm moves to the position shown by Figure 10 and the stripping rod is moved forwardly by the pressure of the stripper plate 127 against its rearward end, this pressure being caused by the pressure against such section of the lower rear pressure plate 136.

In order to position the film laterally within the gate and to hold it therein during the rewinding as well as the projection cycle, the positioning fingers 152 may be provided as is clearly shown in Figures 8, 9 and 10 of the drawings. Such fingers may be mounted for arcuate movement as upon the perpendicular rod 153 supported in any appropriate manner substantially parallel to the direction of travel of the film through the gate and urged inwardly as by the spring 154. It will be noted that the fingers 152 in moving to operative position engage the adjacent side edge of the film and may move the same laterally from the adjacent outside region between the gate sections.

The control cam 155, adapted to cooperate with the right angled projection 156 of the rear end of the trigger 157, may be attached to such rod. Such trigger may be pivoted as upon the stud 158 and the forward inwardly deflected portion thereof be held under the tension of the spring 159. As the control arm 150 is moved to the right, from the position shown in Figure 9 to that shown in Figure 10, it bears against such forward inwardly deflected portion of such trigger and moves such trigger so that the right angled extension 156 is moved inwardly, and away from the flat face of the cam, thus permitting the spring 154 quickly to rotate the fingers 152 from the position shown in full line in Figure 9 to that shown in dotted line. The gate plate 125 and the guide plate 131 may be formed with openings through which such fingers may operate. Thus it will be seen that such rotation of such fingers will force the film laterally within the gate and in proper position relative to the film-moving means later described and also that it will hold it within the gate.

Under certain conditions, a modification of the above described mechanism may be employed. As is clearly shown in Figure 8A, the arm 150' may be provided, attached to and movable with the control saddle 145, such control arm 150' otherwise being of characteristics similar to those of control arm 150.

Means, later described, may be employed to move the control arm 150 or 150' in timed relation to the actuation of other operations of the apparatus.

The positioning fingers may be reset by hand.

To move the film intermittently through the gate any suitable mechanism may be employed. It may be preferred, however, to construct such movement as a unit which may be easily placed in operative relation with the machine or removed for replacement or repair.

As is clearly shown in Figures 1B and 1C, such movement may be mounted as upon the plate 165 supported as upon the main frame F. Upon the rearward portion of such plate there may be attached the guide rod 168 and upon the forward portion thereof there may be placed the spaced guide 169. Adapted to movement along such guide rod 168, there may be provided the intermittent carriage 170, an extension 171 from which moves within the slot formed between such guide 169 and such plate 165. There may be positioned upon the main operating shaft 167 the heart shaped cam 172 and the pusher cam 173, the latter of which is mounted upon an extension of the hub of the former. Co-acting with the surfaces of the cam 172 may be the two shoulders 174 and 175 formed in the surface of the intermittent carriage 170. The surface of the cam 172 may be of any appropriate contour whereby when such cam is revolved as by the shaft 167 the intermittent carriage is intermittently moved upwardly and downwardly. Pivoted to the lower portion of such intermittent carriage 170 as by the rod 176 there may be provided the moving fingers plate 177 formed preferably of one piece so shaped as to embody four forwardly facing moving fingers or teeth 178. The surface of the cam 173 may bear against the inner portion of such intermittent fingers plate and be constructed of such contour as to force it to the left as viewed in Figure 1B at the moment of the conclusion of the upward movement of the intermittent carriage 170 and to retain it in such forward position during the downward movement of such carriage. At the conclusion of such downward movement the moving fingers 178 may be disengaged from the perforations in the film as by the spring 179, the contour of the cam being such as to permit this movement to the right as viewed in Figure 1B of the drawings.

In order that the film may be held firmly in the gate during the period of exposure retaining fingers may be provided.

Two such fingers 180 may be formed as in the end of the retaining fingers plate 181 pivoted as upon the rod 182 fixed to the plate 165, such teeth operating within the opening provided in the moving fingers plate 177. Bearing against the right hand surface of such retaining fingers plate 181, as viewed in Figure 1B, may be provided the retaining fingers pusher cam 183, which may be mounted as upon the extended hub of the heart shaped cam 172. Such pusher cam 183 may be a duplicate of intermittent fingers pusher cam 173, but mounted at substantially 180 degrees rotation relatively thereto. The retaining fingers plate 181 may be withdrawn from the perforations of the film as by the spring 184.

By reason of the above construction it will be evident that the retaining fingers 180 will be in contact with the perforations of the film during the period in which the moving fingers 178 are out of such contact. It may be preferred that the contour of the cams be such that before the retraction of one set of fingers the other set of fingers will be introduced therein, thus retaining the film under proper control at all times.

It will be readily understood that the assembly of such a movement in operative relationship with the apparatus is simple and inexpensive. Aside from the attachment of the plate 165 to the main frame of the apparatus, the only operation is the attachment to the operating shaft of the apparatus of the one cam 172 bearing upon an extension of its hub the cams 173 and 183. It will also be understood that since the moving and retaining fingers are formed in or attached to pivotally mounted plates which move through arcs which are short relatively to their radii, wear upon the film moving mechanism is minimized. Moreover, since all fingers enter the perforations of the film in an arcuate track, preferably while the film is pinned motionless, contact between the material surrounding the perforations and such fingers is minimized, thus reducing wear upon both fingers and film.

Cooperating with the intermittent movement, such as that described above, and with the aperture 128, a shutter, as is well known in the art, may be provided. It may be preferred adjustably to mount such a shutter 185 upon the shutter support 186 attached to the end of the shaft 187 which is suitably journalled for rotation as in the extension 188 which may be formed as upon the plate 30 of the main frame and terminates in the bevelled gear 189 which meshes with the bevelled gear 190 upon the shaft 191, suitably journalled for rotation within and at right angles to such plate 30 such shaft having attached to the opposite end thereof the spur gear 192 which through the gear 193, mounted as upon the shaft 194, suitably journalled for rotation, meshes with the gear 195 attached to the main operating shaft 167. Thus it will be understood that the revolution of the operating shaft 167 will operate the film moving mechanism and the shutter simultaneously.

In order to eliminate the necessity of providing for unsupported loops of slack film as has been common in the art in order to compensate for the differences of character in movement in the continuously rotating supply and take-up spindles and the intermittent operating feeding members there may preferably be employed the tension-control system of feeding certain features of which are disclosed and claimed in the co-pending application of Clarkson Ulysses Bundick and myself, Serial Number 44,482, filed July 18, 1925.

The film passing from the supply reel 197 upon the delivery spindle 53 to the reel 198 upon the take-up spindle 87 and through the gate preferably passes over the spring tension pads 199 and 200 carried respectively by tension control arms 201 and 202 having respective pivotal mountings 203 and 204 upon the frame F, and being guided against lateral movement as by the guide plates 205 and 206, supported in spaced relationship to the frame F, with which the left hand ends of the tension control arms as viewed in Figure 1 of the drawings and the guiding extensions 207 and 208 coact. To the tension arms are attached the tension springs 209 and 210 respectively secured at one end to their cooperating tension arms and at the opposite end to appropriate members 209' and 210' projecting from the frame F.

During the feeding cycle, as the film travels from such supply reel to such delivery reel, each of which is revoluble in the direction indicated by the appropriate arrows in Figure 1, urged by the intermittent mechanism hereinbefore described, it is at once placed under a condition of tension. This causes the upper tension arm 201 through its pad 199 to be depressed as viewed in the drawings whereby the spring 209 is placed under a condition of increased tension. A portion of the pull so exerted upon the film is directly communicated to the mass of film carried by the supply reel 197, and a small portion of the film drawn therefrom. As the film comes to rest in the gate hereinbefore described in detail, the tension arm 201, urged by the power thus previously stored in the spring 209, moves upwardly and draws from the reel an additional supply of film. Simultaneously with the conclusion of this upward movement, however, the intermittently operated moving element is again in action and the film is again pulled downwardly through the gate. The length of film required to compensate for that moved downwardly is drawn in part directly from the source of supply upon the reel 197 and in part from the amount of film which has been fed forwardly by the previous upward movement of the tension arm 201. Since in the spindle 53 there is a certain resistance to rotation by reason both of inertia and friction, the reel 197 is caused to move at intermittently varying rates of speed at different parts of each feeding cycle; but in actual practice, it has been found that under ordinary conditions of operation it never comes to a complete stop. The flat spring constituting the pad 199 also serves as a cushioning medium between the intermittent feeding mechanism and the film on the supply reel and as supplemental to the action of the spring 209.

Below the gate the corresponding tension arm 202, with its spring pad 200 over which the film travels, operates in substantially the same fashion. As the film is pulled downwardly by the action of the intermittent feeding mechanism, the tension of the spring 210 operating through the arm 202 causes the spring pad 200 to remain in contact with the film and to keep it under tension. In the meantime, however, the rotation of the take-up spindle effected by mechanism herein before described, tends to wind the film upon the yieldingly driven take-up reel 198 and to increase the tension of the spring 210 ready for the beginning of the next cycle of operation. Thus the tension of the film itself and of the spring 210 is opposed to the driving means for the spindle 87, the balance between the two in the invention herein disclosed being maintained primarily by and through the film. The flat spring constituting the pad 200 is supplemental to the action of the spring 210 and serves as a cushioning medium for the film.

From the foregoing, it will be apparent that from the beginning of the feeding movement, the film is automatically placed under the desired condition of tension without any attention by the operator, and that this condition is automatically maintained during the operation of the apparatus.

Experience has demonstrated that the above method of feeding film whereby it is maintained under conditions of continuously controlled tension throughout the entire operative or unwound length of the film from the supply reel to the take-up reel and whereby the two reels are moved in certain timed relation or synchronism with the intermittent movement at the gate, effects a feeding of the film with considerably less wear to the perforations than is possible with the conventional method of feeding involving the use of continuously rotating feeding and taking up sprockets associated with unsupported loops of slack film. Although it is preferred to utilize a tension control as herein described, it will be understood that the utility of the invention is not limited with respect to the particular mechanism for effecting film feeding and that any desired form of sprockets, take-up mechanism, and the like, with their associated loops of slack film or any other desired mechanism, may be used if preferred.

Under normal conditions of feeding it has been found entirely practical to rely upon the tension control apparatus as above set forth but in order to compensate for unusual conditions of feeding which may be caused by improperly lubricated bearings, poorly wound films, temperature changes and the many other minor emergencies which continually occur in a film feeding apparatus, it has been found desirable to supplement the above described tension control means with a braking mechanism.

The shaft 203 upon which the tension arm 201 is pivoted may extend through plates 30 and 35 of the frame F. Attached to such shaft there may be provided a block 211 with the rewinding spindle brake hook 212 extending forwardly therefrom and adapted to cooperate with the plate 81 which is rotatable upon the rod 80 perpendicularly mounted upon an appropriate portion of the re-winding spindle carriage, as has previously been described. The length and mounting of the plate 81 as can be readily seen, permit it to coact with the pulley 56 in various positions of the same.

It will be readily understood that as the tension arm 201 is depressed the shaft 203 and the plate 81 will be rotated against the pressure of the spring 83 whereby the brake pad 82 is removed from co-action with the plate 71 or its pressure thereupon greatly reduced. Thus if the film is not fed from the reel 197 upon the re-winding spindle 53 with normal rapidity the braking pad 82 is removed from co-action therewith or the pressure therebetween much reduced thus permitting the spindle to be revolved more rapidly by the pull of the film. If on the other hand the film tends to be fed too rapidly and to over run, the tension arm 201 is permitted to move upwardly thus applying braking pressure to the rewinding spindle.

There may be provided similar braking mechanism cooperating with the tension arm 202 between the intermittent feeding member and the take-up spindle. As the tension arm 202 is moved upwardly by pressure thereupon from the film caused by too rapid rotation of the take-up spindle, the take-up brake hook 219 attached to the pivotal shaft 204 as by means of the block 220 bears against the surface of the plate 119 thus moving it against the pressure of the spring 121 and removing the brake pad 120 from the plate 111 of the take-up spindle clutch, or reducing its pressure thereon. Thus it will be understood that as the take-up spindle 87 tends to rotate too rapidly, the braking pad is applied thereto and its speed diminished and greater length of film is permitted to accumulate between the intermittent moving member and take-up reel. If on the contrary this amount of film becomes too great the tension arm 202 moves downwardly thus reducing the braking pressure and permitting the take-up spindle to revolve more rapidly.

It will readily be understood that the proper conditions of film feeding are maintained at all times, the strain upon the film very much reduced, and the threading of the film into operative position much expedited.

It will be understood that apparatus according to my invention may be constructed to operate with unsupported loops of slack film, formed as by the operation of the so-called continuous sprockets, or with optical rectification, so-called.

To operate the apparatus, power may be applied to the main operating shaft 167 through an operating clutch, the driving portion of which is effective to revolve the driving pulley of the rewind spindle clutch.

The main driving pulley 240 may be mounted loosely as upon the operating shaft 167, and driven as by the motor M as by means of the belt 241 passing over the pulley 242 which may be pinned to the armature shaft 28 of the motor, and the idler 243, revoluble as upon the stud 244 extending from the main frame F. As is clearly shown in Figure 7, the pulley 245, of any suitable diameter, may be formed upon or attached to such main driving pulley in line with the driving pulley 56 of the rewinding spindle carriage, power being communicated as by means of the belt 246 which may pass over the double idlers 247, which may be suitably mounted for rotation as upon the lever 248 which may be appropriately pivoted to the main frame as upon the pin 249, such lever being urged to the right as viewed in Figure 7 as by the spring 250. Thus it will be understood that irrespective of the position of the rewinding spindle carriage upon the rewinding spindle carriage track, the belt 246 will be kept tight and fully operative.

The driven portion of the main operating clutch may consist of the disc 251 to the left side of which, as viewed in Figure 2, there may be attached a friction surface 252 of leather or some other suitable substance, the disc 251 being pinned to the operating shaft 167 and being urged to the left, as viewed in Figure 2, or operative position, as by the spring 252' which may bear against the head 253 of the operating shaft 167 and the collar 254 formed as upon the driven disc 251. Fingers 255 extending as from the forked end of the clutch control arm 256 may be provided to co-act with the annular depression 261 formed in the collar 254. In order to hold the clutch to the inoperative or right hand position as viewed in Figure 2, the control arm 256 may be attached to the rod 257 supported as in the brackets 98 and 62 extending as from the plate 35 and attached to the crescent shaped plate 258, the rearward or right hand end of which, as viewed in Figure 3A, bears against the rod 259 which is rotatable with the main control shaft 268. As such shaft is rotated, in the manner later described, to position S1, the lower or contacting end of the rod 259 is moved to the left, as viewed in Figure 3A, permitting the end of the plate 258 to pass beyond it and such plate, rod 257 and control arm 256 to be rotated by the pressure of the spring 252' and the clutch to become operative by the friction surface 252 bearing upon the friction surface 260 which may be affixed to the appropriate side of the driving pulley 240. As the main control shaft 268 is rotated in the contrary direction as away from position S1, the arm 256 is moved in the opposite direction, the spring 252 is compressed, and the clutch made inoperative.

The pulley 262 may be attached to and revoluble with the spur gear 193 which, as previously described, enmeshes with the spur gear 195 which is pinned to the operating shaft 167. As is clearly shown in Figure 7 of the drawings, the revolution of such pulley may drive the take-up spindle pulley 91 as by means of the belt 263 passing therebetween and over the idler 264 rotatable upon the belt tightening lever 264' which is pivoted as upon the pin 265 in the main frame F and urged to the right as viewed in Figure 7 as by the spring 266, thus assuring the operativeness of the belt 263 irrespective of the position of the take-up spindle carriage along the take-up spindle track.

In order to render the operation of the apparatus simple and automatic and within the capacity of an unskilled or amateur operator, there may be provided unitary means for controlling in the manner desired all the operations of the apparatus. The control mechanism, herein described, is an improvement upon that disclosed and claimed in my co-pending application Serial Number 54,910 filed September 8, 1925, and that disclosed and claimed in my copending application Serial Number 348,633 filed March 20, 1929, which is a continuation in part of said application.

For such control of the apparatus, I may provide a primary control member 267 pinned to the main control shaft 268 and movable through an arc. Upon the lower end of this lever, I may provide a knob 269 terminating inwardly in a pin 270 adapted to cooperate with the openings in the plate 46, such openings representing the different operating stations and designated as station S1, station S2, station S3, and station S4 respectively, such stations respectively representing a projection-in-motion position, a still projection position, a film threading position, and a rewinding position. To insure the positioning of such a pin when moved into each such station, the lever 267 may be constructed of spring metal and further restricted in its outward movement and urged inwardly as by the bar 271, which bar is movable toward and away from the plate 46 as upon the headed pins 272 and urged inwardly thereupon as by the springs 274. As previously stated, the control saddle 145 may be loosely mounted upon the control shaft 268. The control arm 150 may be pinned to such shaft 268.

Mounted as upon the rod 281 which may be supported upon and between the shoulders 282 and 283 of the control saddle there may be provided the compression springs 284 and 285, the ends of which bear against the sides of the control arm 150. The movement of the control saddle may be restricted. As it is moved to the right as viewed in Figure 8, the right side of the lower portion of such saddle may bear against the left side of the bracket 140, as viewed in Figure 8. Similarly movement to the left as viewed in such Figure 8 may be restricted as by the head 286 of the rod 139 bearing against the right side of the bracket 140. It will be readily understood, however, that the control shaft 268 may be rotated further to the right as viewed in Figure 8, the control arm 150 compressing the spring 284, and further to the left, such arm 150 compressing the spring 285.

In case use is made of the modified construction shown in Figure 8A, a spring compression lever 150″ may be attached to the shaft 268 and coact, as above described, with such springs 284 and 285.

The main control shaft 268 may extend through the plate F and upon the other side of such plate loosely mounted on such shaft may be provided the take-up spindle actuating plate 287 and attached to such shaft and rotating therewith there may be provided the pin 259, the movement of this pin being effective to operate the main operating clutch, the take-up spindle clutch and heat screen, and the rewinding spindle clutch.

As previously described, the lower portion of such pin may cooperate with the crescent shaped member 258 to control the main operating clutch. The upper portion of such pin 259, as is clearly shown in Figures 4 and 6 may be bent to the right as viewed in Figure 4 and terminate in a right angled portion which when moved to the position shown in Figure 4 will bear against a right angled projection 288 formed upon one end of the plate 289 to rotate the same. Such plate 289 may be mounted for rotation as upon the bracket 290 which may be attached to the main frame F. To the opposite end of said plate, the heat screen control rod 21 may be attached, whereby such rotation of such plate 289 moves the heat screen 14 to inoperative position.

Such movement of such pin 259 from the position shown in Figure 3 to that shown in Figure 4, will also be effective to actuate the take-up spindle clutch since the lower end of the pin 259 will bear against the left side of the right angled projection of plate 287 thus forcing it against the pin 101 and thereby actuating the take-up spindle clutch as previously described. The detent 291 may be provided to limit the movement of such plate 287 to the right, as viewed in Figure 6, after contact of the pin 259 has been removed therefrom.

Since it may be preferred to actuate the take-up spindle clutch before the actuation of the film moving means, crescent-shaped member 258 and plate 287 may be so shaped that the pin 101 is moved and the take-up spindle put into operation before the main power clutch is put into operation.

The rotation of the shaft 268 to the position shown in Figure 6 of the drawings will be effective to bring the upper portion of the pin 259 against the end of the rod 65 thus longitudinally moving the same and actuating the rewind spindle clutch.

Connection between the main control shaft 268 and the rewinding brake control rod 78 may be secured in any appropriate manner, as, for example, as is shown in Figures 11 and 12.

Loosely mounted upon the brake rod 78, there may be provided the collar 292, such rod and collar being of similar non-circular cross section. Such collar may include an extension as at right angles to the axis of such brake rod, near the outer end of which there may be provided an opening into which the bent end of the rewinding brake control operating rod 293 may fit. It will be readily understood, therefore, that the longitudinal movement of such operating rod will be effective to rotate such brake rod. Such longitudinal movement may be imparted as by the rotation of the collar 294 which may be loosely mounted upon the main control shaft 268 and to which there may be pivotally attached the pawl 295, which may be urged downwardly as by the spring 296, its downward movement being limited as by the stop 297 affixed to and projecting from the collar 294. Such collar 294 may be urged downwardly as against the stop 298 as by the spring 299. Pinned to the main control shaft 268 adjacent to the collar 294 and in line with the member 267 may be provided the tooth 300. As the main control member 267 is rotated to the right as viewed in Figure 11 from station S4 toward station S3, the pawl 295 will remain in operative relation with the control tooth 300 whereby the movement of the main control member 267 will be communicated to and will rotate the re-winding brake rod 78 thus applying the brakes 79 and 117. As the main control lever is rotated to the right of the station S3 as viewed in Figure 11 toward the station S2 the movement of the pawl and its supporting collar 294 jointly with the main control arm 267 will be interrupted by the engagement of the extension 301 of the pawl 295 with the stop 302 whereby the tooth of the pawl is removed from engagement with the control tooth 300 and snaps back, urged as by the spring 296, thus permitting the collar 294 to be moved downwardly by the spring 299 to the stop 298. Thus the brake rod 78 will be rotated to the left as viewed in Figure 11 and the brake pads 79 and 117 removed from the operative position. Further rotation of the main control member 267 to the right as viewed in Figure 11 would be without effect upon this braking mechanism. As the main control member is rotated to the left as viewed in Figure 11 from station S3 toward station S4 the tooth 300 will again engage with the tooth of the pawl 295 and set the re-winding brake control mechanism in position for operation as above described when said control lever is again rotated to the right as viewed in Figure 11.

In order to make clear the automatic operation of the apparatus by means of the mechanism which has been described above, the following description is given by way of illustration:

The user first turns on the current, thus illuminating the light source L and actuating the motor M. It will be understood that during the entire period of operation of the mechanism the motor and lamp remain operative. Thus the cooling means is continuously operating and at all times sufficient light is provided through the heat screen 14 to illuminate the film gate and to enable the user to see what he is doing.

It will be assumed that the control member 267 is situated in the film threading position S3 with the pin 270 in the appropriate opening in the plate 46, the lateral positioning fingers 152 being in the open position with the flat portion of the control cam 155 against the right angled extension 156 of the trigger 157. The user may then place the full reel of film 197 upon the spindle 53 and lay the film over the tension pad 199, through the gate, over the tension pad 200 and place the end within an appropriate fastening not shown upon the reel 198 upon the take-up spindle 87. In place of an open reel, a film magazine of any desired characteristics may be used.

The user thereupon may move the control member 267 from station S3 toward station S2 and in the manner previously described the trigger 157 is released and the lateral positioning fingers move the film completely within the gate and lock it therein. It will, of course, be understood that such trigger 157 may be so shaped that the positioning fingers may be released at any desired point in the travel of the control member from station S3 toward station S2, it being preferred, however, that the fingers become operative almost immediately upon the movement of the member away from station S3. Thereupon the movement of the control member will be continued without pause and the pin 270 find its place in the opening at station S2. During this travel of the control member the main control shaft 268 will have been rotated in an anti-clockwise direction, as viewed in Figure 1 of the drawings and with the control mechanism at station S2 the parts will be found in the position clearly shown by Figure 3. In the manner previously described, the gate control rod 139 will have been moved to the position shown in Figure 10 of the drawings, the stripping plate 127 moved into alignment with plate 126 by the pressure of the rear gate section 136, the stripping rod 146 moved forwardly, the film moved forwardly into proper position and the gate completely closed. Light from the source L, condensed by the lens 10, will be projected through the film opposite the aperture 128, the objective lens 44 and upon the screen, the heat shield 14, still in light intercepting position in the mouth of the cone 12, protecting the stationary film from the full heat of the light source.

The user may thereupon move the control member to station S1, thus further rotating the main control shaft 268 in such anti-clockwise direction to the station S1 as shown in Figure 1. The control saddle 145, as previously described, will move no further, the spring 284 having been compressed in the movement of the control member from station S2 to station S1. The operating parts for the heat screen and for the take-up spindle clutch will now be found in the position clearly shown by Figure 4, the rotation of the main control shaft 268 having moved the right angled extension of the rod 259 against the extension 288 of the plate 287 thus in the manner previously described moving the heat shield 14 to inoperative position in the cone 12 of the lamp house and the movement of the lower portion of the rod 259 having moved the lower portion of the plate 287 against the longitudinally movable pin 101 thus rotating the take-up spindle control rod 96 and placing the take-up spindle in operation.

In the manner previously described, the crescent shaped plate 258 will have been moved clear of contact with the rod 259, thus permitting the main operating clutch to become operative to drive the film moving mechanism and the shutter.

It will, of course, be readily understood that the user may move the control member directly from station S3 to station S1 thus placing the apparatus in complete motion picture projecting position at once.

As previously stated the take-up spindle may be actuated before the film moving and retaining fingers. Thus if one set or the other of such fingers are not in contact with appropriate perforations in the film, the film will be moved slowly across the ends of the motionless teeth until the teeth find and engage with the appropriate perforations. Consequently there will be no thrust of such teeth against the unperforated sections of the film. The springs 138 will be sufficiently compressible to protect the film against tearing because of the movement of the film over the ends of the teeth. Experience has shown, however, that such movement of the film over the ends of the teeth is relatively much less harmful than the direct thrust of the teeth.

If the user wishes to interrupt the projection of pictures in motion to observe a single picture at leisure he will move the control member 267 from station S1 to station S2 thus declutching the take-up spindle in the manner previously described and by the compression of the spring 252' breaking the connection between the film moving and retaining mechanism and the shutter and the source of power, and by the movement of the rod 259 away from the extension 288 of the plate 289 permitting the spring 20 to become operative to move the heat screen 14 to the closed position in the mouth of the cone 12.

It may be assumed that while the forward or leader end of the film is attached to a carrier in position upon the take-up spindle 87 the user wishes to remove the film from the apparatus. He will thereupon move the control member 267 to the left as viewed in Figure 1 of the drawings to station S3, thus in the manner previously described opening the gate. If the block 151 is situated sufficiently far to the right, as viewed in Figure 9 of the drawings, upon the control rod 146, such movement of such control arm will be effective to move the stripping plate 127 to the stripping position thus removing the film from the moving or retaining teeth and protecting it therefrom. He may there reset the positioning fingers 152 and by a lateral movement of the film carriers remove the film from the apparatus.

It will, of course, be readily understood that the user may proceed direct from station S1 to station S3 without stopping at an intermediate station.

It may also be assumed that the user wishes to rewind the film. In that event, he will move the control arm through station S3 to station S4, the lateral positioning fingers 152 remaining in the closed position. If the control block 151 is situated further to the left as viewed in Figure 9 than is described above, so that the arm 150 or the arm 150' has not been in contact with it to move the rod 146 to the left as viewed in Figure 9 and hence actuate the stripping plate 127 prior to the conclusion of the movement of the control member 267 to station S3 from station S2, such movement will take place during the movement of the member 267 from station S3 to station S4. With the control arm at station S4, the parts will be in the position shown in Figure 6 of the drawings and the rewind spindle clutch will have been actuated by the movement to the left as viewed in such Figure 6 of the rods 259 and 65 and the rotation of shaft 61.

It will be understood that if the block 151 is so positioned as to actuate the stripping plate 127 by contact with the arm 150 prior to the opening of the gate, the stop 130 may be so adjusted as to permit further movement of the rod 146 against the plate 127 as the control member is moved from station S3 to station S4. If use is made of the construction shown in Figure 8A, no movement of the control arm 150' will take place as the control member 267 is moved from station S3 toward station S4.

The rewinding operation is normally carried out at very high speed, with entire safety to the film since its perforations are completely out of contact with any teeth and it is completely protected therefrom as by the stripping plate 127 and locked against lateral movement as by the fingers 152.

If the user wishes rapidly to rewind only a portion of the film and then reproject such portion, injury to the film might be caused except for the provision of the rewinding brake previously described. After the declutching of the rewinding spindle 53, the momentum of the take-up spindle 87 might be sufficient to pay off a considerable length of film between the take-up carrier 198 and the intermittent movement. If the feeding movement were then recommenced and more film fed from the intermittent movement, against the momentum of the rewinding spindle and into the surplus film below the gate, injury to the film would be likely. Under certain circumstances, the gate might be closed before the film had ceased moving rapidly, and the film might even be placed against the moving members and such members actuated while the film was still moving in a rewinding direction. Moreover, at the conclusion of the rewinding operation after all of the film has been rewound as upon the carrier 197, it will be evident that the momentum of such carrier if unchecked might be sufficient to continue its rotation for a considerable period, thus endangering the loose end of the film.

All of the difficulties suggested above are obviated by the use of the rewinding braking mechanism previously described. As the user moves the control member 267 from station S4 to station S3, he applies braking pressure to both rewinding and take-up spindles and to the carriers thereupon. The longitudinal movement of the arm 293, urged by the collar 294, pawl 295, and tooth 300 will rotate the shaft 78 and apply the brakes 79 and 117 to the braking discs 74 and 113.

From the foregoing description it will be evident that the control member is moved to either station S1 or to station S4 against the pressure of the compression springs 284 and 285 respectively. If the user through carelessness does not move the control member completely into either station S1 or station S4 the pressure of such springs will force the control member to a neutral position in which position the heat screen is in the protective position and all feeding means inoperative upon the film.

It will also be understood that the pressure of the bar 271 and the spring characteristics of the control member 267 will be effective to retain the pin 270 in any of the station openings in the plate 46 against accidental displacement therefrom when it is once placed therein.

It will be understood that the forward end of the trigger 157 is easily accessible to the finger of the operator in case he wishes to set by hand the lateral positioning finger 152.

For the purpose of still further illustration, it may be assumed that the user wishes to make use of a film magazine or other carrier constructed for the short length of film and hence of relatively small radius. Provision is made whereby the distances between the centers of the spindles may be instantly changed to accommodate a double or single magazine or a reel of any desired size, such as for example, the commonly used 16 millimetre four inch or seven inch reel.

To make such an adjustment, the user will loosen the thumb screws 86 and 124 and move the rewinding spindle carriage along the rewinding spindle carriage track and the take-up spindle carriage along the take-up spindle track until the spindles 53 and 87 are situated at whatever distance from each other may be necessary to accommodate the carrier or carriers which are to be used. Thereupon the user tightens such thumb nuts thus maintaining the two carriages in the desired relationship to each other and to the optical axis of the apparatus.

It will be understood that the belt tightening mechanism previously described will have been operative both to take up any slack which may have been created in the belts and also to position the belts properly.

The position of the parts when the spindles are in relatively close relation is clearly shown in Figure 7.

It will also be understood that the re-winding spindle control rod 61 will have been moved downwardly through the appropriate opening of the collar 63 and will be operative in the new position. It will also be understood that the upward movement of the take-up spindle carriage will have moved the take-up spindle control rod 96 through the appropriate opening in the collar 97, these parts also being in operative relationship at the new position. Similarly the re-winding spindle brake hook 212 will have remained in contact with the plate 81 and the take-up spindle brake hook 219 will likewise have remained in contact with the surface of the take-up spindle plate 119. Similarly the rewinding brake arms 77 and 116 will move with their respective carriages and be operative at any position.

Certain of the advantages of my invention are evident from the foregoing portion of this specification.

Other advantages of my invention arise from the provision of film handling apparatus which can be automatically threaded and operated and controlled in the manner desired, and instantly adjusted to accommodate film carriers of different characteristics.

Further advantages arise from the provision of apparatus in which the various operations necessary or convenient in film feeding are carried out sequentially, this sequential operation being necessary to a completely automatic film handling mechanism.

Further advantages arise from the provision of mechanism which lessens the likelihood of damage to films handled thereby. Still further advantages arise from the provision of mechanism which can be cheaply and easily constructed, assembled and repaired, and is noiseless in its operation.

I claim:

1. In a film handling apparatus, film feeding mechanism, a gate through which a film is fed, means for closing or opening said gate, means for bringing the film into driven relation with said feeding mechanism, means for bodily removing the film from such driven relation with said feeding mechanism, and sequential control mechanism interlocking all of said means, said sequential control mechanisms including devices for operating said means for bringing the film into driven relation with said feeding mechanism substantially simultaneously with the closing of said gate and beginning to operate said means for bodily removing the film from said feeding mechanism after said gate has been moved approximately to its full open position.

2. In a film handling apparatus, a gate, said gate intersecting an optical axis of the apparatus and including two plane sections movable relatively to each other, means for moving said sections into cooperative and parallel relation whereby a path is defined therebetween through which a film may be fed or for moving one of said sections a predetermined distance away from said other section in a direction parallel to such optical axis and for moving said other mentioned section toward said first mentioned section to a position wherein said other mentioned section is disposed obliquely to said first mentioned section a distance less than such predetermined distance whereby said gate is opened and said path is traversed by said second mentioned section.

3. In a film handling apparatus, a supporting frame, a first gate section disposed upon one side of said frame at approximately a right angle thereto and intersecting an optical axis of the apparatus, mounting for said first section, said first section and said mounting therefor being so constructed and arranged that said first section is movable in a direction along such optical axis, a second mounting extending from the same side of said frame parallel to said first mentioned section, a second gate section pivotally mounted upon said second mounting for movement in a direction angular to such optical axis, a formation disposed between said sections for limiting such movement of said second section, and a guiding member disposed at substantially a right angle to said second mounting upon the side thereof remote from said frame and extending therefrom to said stop formation for the purpose of preventing the insertion of a film between said second mounting and said second section.

4. Apparatus for feeding film which comprises a film feeding member, an openable gate, means for bringing a film into operative relation with said feeding member and for closing said gate, means for opening said gate, means for bodily removing the film from said member after said gate is opened, means for rewinding the film through said gate, and sequential control mechanism, said control mechanism interlocking all of said means and including devices for first operating said means for bringing the film into operative relation with said feeding member and for closing said gate, second operating said means for opening said gate and maintaining said means for bodily removing the film from said feeding members ineffective, third operating said means for bodily removing the film from said feeding member, and fourth operating said rewinding means.

5. Apparatus for feeding film which comprises film feeding mechanism, an openable gate, means to bring a film into operative relation with said feeding mechanism and to close said gate, means to connect said mechanism with a source of power, means to disconnect said mechanism from said source of power, means to open said gate, means bodily to remove the film from said mechanism, means to rewind the film through said gate, and control mechanism interlocking all of said means, said sequential control mechanism including devices first for actuating said means to bring the film into operative relation with said feeding mechanism and to close said gate, second for operating said means to connect said mechanism with a source of power, third for operating said means to disconnect said mechanism from said source of power, fourth for operating said means to open said gate and for maintaining said film removing means inoperative until said gate opening operation is substantially completed, fifth for starting the operation of said film removing means, and sixth for operating said rewinding means.

6. In a film handling apparatus, a gate, said gate comprising a plurality of film-path-defining sections, at least one of which is movable relatively to another, along which sections a film may be longitudinally fed, a first means for so feeding a film therebetween, said means including a toothed member which projects through said movable section for engaging the film, means for moving said movable section into a first position, wherein said sections are in cooperative relation and the film is in cooperative position relative to said member, or to a second position, wherein the film is brought beyond the range of operation of said member, a second means for longitudinally feeding the film past said sections, and interlocked sequential control mechanism for all of said means.

7. Film feeding apparatus, comprising a delivery spindle, a take-up spindle, feeding means engaging a film between said spindles and effective for moving the film supported upon said delivery spindle toward said take-up spindle, a gate disposed between said spindles through which the film passes, means for opening said gate, said gate including a section arranged that upon movement to a predetermined position it removes the film bodily from said feeding means, means for moving said section to such position, means for applying power to said delivery spindle for the purpose of revolving the same so that the film supported thereby is rewound through said gate from said take-up spindle, and sequential control means interlocking all of said means and including devices first for operating said means for opening said gate and maintaining said film removing section motionless, second for operating said means for moving said film removing section, and third for actuating said means for driving said delivery carrier in a rewinding direction whereby the film is rewound through said gate.

8. Film feeding apparatus, comprising a delivery member, a take-up member, a feeding member adapted to engage a film therebetween, a gate including a plurality of sections movable relatively to each other, means for moving two of said sections to one position wherein they define a path through which the film may be fed from said delivery toward said take-up member, and into which path said feeding member extends, and upon movement to a second position wherein one of said sections is disposed between the film and the teeth of said feeding member, means for effecting movement of said take-up member whereby the film is moved in one direction through said gate, means for effecting movement of said delivery member in a rewinding direction whereby the film is moved in the other direction through said gate, and control mechanism interlocking said moving means and said gate moving means and effective to dispose said sections in said first position and to actuate said means for effecting movement of said take-up member or to dispose said sections in said second position and to actuate said means for effecting such rewinding movement of said delivery member.

9. Film feeding apparatus, comprising a toothed feeding member adapted to engage a film, a gate through which the film passes, said gate including two complementary parallel sections each movable in relation to the other thereof, means for effecting movement of the film in one direction through said gate between said sections, means for effecting movement of the film in the other direction through said gate, means for moving said two gate sections into a first position wherein one of said sections brings the film into operative engagement with the teeth of said feeding member and said other mentioned section and to a second position in which said other mentioned sections removes the film from engagement with the teeth of said member, and sequential control mechanism interlocking said film moving means and both of said movable sections and effective first for moving said sections to said first position and thereafter for actuating one of said means and second for moving said sections to said second position and thereafter for actuating said other mentioned means.

10. In a film handling apparatus, an apertured gate, a source for directing light upon the aperture of said gate, a shield movable to a position between said source of light and such aperture for diminishing the light effective thereupon, a spring normally tending to hold such shield in such position, film feeding mechanism, a source of power therefor, a clutch for connecting said mechanism with said source of power, means for operating said clutch, and a link connecting said means and said shield and effective for overcoming the power of said spring upon the movement of said clutch to operative position and for moving said shield from such position to a position outside of the path of light between said source and such aperture.

11. In a film handling apparatus, an apertured gate, means for opening or closing said gate, a source for directing light upon the aperture of said gate, a shield movable to a position between said source of light and such aperture for diminishing the light effective thereupon, means normally effective for maintaining said shield in such light intercepting position, means for opening or closing said gate, and a link between said means for opening or closing said gate and said shield effective to overcome said means for maintaining said shield in such light intercepting position upon the movement of said gate to closed position.

12. In a film handling apparatus, a gate, said gate including two movable sections, means for moving one of said sections to a position relatively distant from the other, means for laterally moving the film into the space which intervenes between said sections when said first mentioned section is disposed in such distant position, a toothed member for feeding the film longitudinally between said sections by engagement with the perforations of the film, means for moving the other of said movable sections to a position wherein the film is brought beyond the range of operation of such teeth, and means, other than said member, for longitudinally moving the film between said sections.

13. In a film-handling apparatus, a gate, said gate including two movable sections, means for moving one of said sections to a position relatively distant from the other, means for moving the film into the space which intervenes between said sections when said first mentioned section is disposed in such distant position whereby the film is initially positioned between said sections, a toothed member for feeding the film longitudinally between said sections by engagement with the perforations of the film, means for moving the other of said movable sections to a position wherein the film is brought beyond the range of operation of such teeth, means, other than said member, for longitudinally moving the film between said sections, and sequential control mechanism interlocking all of said means and effecting the operation thereof in the sequence in which they are herein set forth.

14. In a film handling apparatus, a gate, said gate including two movable sections, means for moving one of said sections to a position relatively distant from the other, means for moving the film into the space which intervenes between said sections when said first mentioned section is disposed in such distant position whereby the film is initially positioned between said sections, a toothed member for feeding the film longitudinally between said sections by engagement with the perforations of the film, means for moving the other of said movable sections to a position wherein the film is brought beyond the range of operation of such teeth, means, other than said member, for longitudinally moving the film between said sections, and a single sequential means for predeterminedly controlling all of said means.

15. In a film handling apparatus, a gate, said gate including two movable sections, means for moving one of said sections to a position relatively distant from said other section, a member for moving the film into the space which intervenes between said sections when said first mentioned section is disposed in such relatively distant position, means coacting with said film moving member for maintaining the film in said space against movement lateral thereto, mechanism for feeding the film between said sections, means for bringing said first mentioned section into relatively close relation to said other section whereby the film is brought into operative position relative to said feeding mechanism, means for actuating said feeding mechanism, and sequential control mechanism interlocking said member and all of said means and assuring the operation thereof in the sequence in which they are herein set forth.

16. In a film handling apparatus, a gate, said gate including two movable sections, means for moving one of said sections to a position relatively distant from said other section, a member operable for moving the film from an outer region adjacent said gate sections into the space which intervenes between said sections when said first mentioned section is disposed in such relatively distant position, means operating said film moving member and effective for maintaining it in position to lock the film against movement lateral to said gate sections, mechanism for feeding the film between said sections, means for bringing said first mentioned section into relatively close relation to said other section whereby the film is brought into operative position relative to said feeding mechanism, means for actuating said feeding mechanism, and a single means effective for controlling all of said means sequentially.

17. In a film handling apparatus, a re-winding carrier, a take-up carrier, an openable gate disposed therebetween, means for feeding a film through said gate from said re-winding carrier to said take-up carrier, means for re-winding the film through said gate from said take-up carrier to said re-winding carrier, mechanism including members movable from relatively distant positions up against an edge of the film for locking the same against movement lateral to said gate during such re-winding operation, and a single sequential control means interlocking all of said means and effective to render said feeding means inoperative, open said gate, and actuate said rewinding means, and means for maintaining said locking means in operative position during all of said operations.

18. In a film handling mechanism, a delivery carrier, a take-up carrier, means for operating said take-up carrier, an openable gate disposed between said carriers, means for feeding a film through said gate from said delivery carrier toward said take-up carrier, mechanism including members movable against an edge of the film for moving the same laterally into a predetermined position within the path of travel between said carriers and for locking it therein against movement lateral thereto, means for operating said delivery carrier for rewinding the film through said gate from said take-up carrier to said delivery carrier, and sequential control mechanism interlocking said gate and all of said means and necessarily effective first for actuating said positioning and locking means and closing said gate, second, for rendering said feeding means and said take-up means operative, third for rendering said feeding and said take-up means inoperative and for opening said gate, and fourth for actuating said means for rewinding the film through said gate, and means for maintaining said locking members in operative relation during all of such operations.

19. In a film handling apparatus, means for intermittently moving a film through a gate, means for continuously moving the film through said gate, a locking member, means for moving said member adjacent one edge of the film to a position wherein it maintains the film against movement lateral to said gate, means for maintaining said locking member in locking position after it has been moved thereinto during the operation of said continuous means, and sequential control mechanism interlocking said continuous feeding means and said moving means and effective for actuating said moving means and said continuous moving means.

20. In a film handling apparatus, a gate, said gate including two sections between which a film travels, one of said sections being movable relatively to the other, a member for initially positioning the film between said sections, and mechanism for operating said member, said mechanism comprising a support for said member arranged for rotation upon an axis which is disposed substantially parallel to the path of travel of the film between said sections and adjacent said section relative to which said first mentioned section is movable, said member being mounted upon said support at right angles to such axis, spring means normally impelling the rotation of said support upon its axis whereby said member is rotated toward said sections for the purpose of laterally moving a film into a position between said sections, and a latch for holding said support against the action of said spring means and in such position that said member is disposed out of the space between the planes projected from said sections when said first mentioned section is disposed in a position relatively distant to said other section.

21. In a film handling apparatus, a gate, said gate comprising a plurality of sections between which a film travels, means effective to move one of said sections to a position relatively distant from another of said sections, a member for laterally moving the film into a position within the space defined between said sections when said first mentioned section is disposed in such distant position, a shaft disposed adjacent said second mentioned gate section and substantially parallel to the path of travel of the film between said sections, said member being mounted upon said shaft at substantially right angles thereto, a spring normally impelling said shaft to rotational movement whereby said member is rendered operative by movement from a plane substantially parallel to such path of travel to one at right angles and adjacent thereto, a latch for holding said shaft against such movement, and an operating connection between said means for moving said movable gate section and said latch whereby said latch is released upon the movement of said movable gate section toward said fixed gate section.

22. In a film handling apparatus, an idling delivery spindle and a continuously driven take-up spindle between which a film extends, an intermittently moving feeding mechanism disposed between said spindles and engaging the film and effective for moving the film from said delivery spindle toward said take-up spindle, means for axially moving said take-up spindle to a plurality of positions, and mechanism coacting with each of said spindles and effective to control the rate of rotation of said delivery spindle and said take-up spindle for the purpose of compensating for the difference of character of movement between such spindles and said intermittently moving mechanism, such compensating mechanisms being mounted for bodily movement each with its respective spindle for cooperation therewith irrespective of the position thereof.

23. In a film handling apparatus, a sectional gate which defines a path through which a film may be fed, said gate including a fixed section so disposed as to define one portion of one side of such path and a section pivoted adjacent thereto for movement relatively thereto and so disposed that when it is placed in one position relatively thereto it cooperates with said fixed section by defining another and adjacent portion of such side of such path, means for moving said pivoted section to or from such position, and means movable up to and away from said pivoted section for defining the opposite side of such path, and permitting the removal of the film from said path.

24. In a film handling apparatus, a gate for defining a path through which a film may be fed, said gate including a fixed section and a pivoted section, said fixed section and said pivoted section both being disposed upon the same side of such path and adjacent each other, means for moving said pivoted section between a first position wherein it cooperates with said fixed section to define one side of such path and a second position wherein it traverses such path, and movable means with extended film guiding surface disposed opposite to said fixed section and said movable section for defining the other side of such path.

25. In a film handling apparatus, a sectional gate for defining a path through which a film may be fed, one of the sections of said gate being pivotally mounted and including an opening, a toothed member for feeding the film through said gate, said member being so disposed that the teeth thereof may project through such opening for engaging the film, means for moving said toothed member in a feeding direction while it projects through said opening thereby advancing the film, means for retracting said toothed member from said opening and moving it to its original feeding position in preparation for another feeding movement, means for maintaining said gate section motionless during such reverse movement of said feeding member, a pivotal mounting for said movable section, and means for moving said section between one position in which the teeth of said toothed member pass through such opening whereby the film may be fed and a second position wherein said movable section is positioned between such teeth and the film.

26. In a film handling apparatus, toothed means for feeding a film, a movable film engaging member positioned between the film and said means, said member including an opening through which the teeth of said means may project into operative relation with the perforations of the film, a pivotal mounting for said member, means to move said member upon said mounting from a position relatively adjacent said toothed means wherein the teeth thereof project through such opening and into contact with the film and a position relatively remote from said member wherein said member is positioned between the film and the teeth of said feeding means, means for moving said toothed member in a feeding direction while it projects through said opening thereby advancing the film, means for retracting said toothed member from said opening and moving it to its original feeding position in preparation for another feeding movement, and means for maintaining said gate section motionless during such reverse movement of said feeding member.

27. In a film handling apparatus, toothed means for feeding a film, a film-engaging member positioned between the film and said means, said member including an opening through which the teeth of said means may project into operative relation with the perforations of the film, a pivotal mounting for said member, means for moving said member upon said mounting from a position relatively adjacent said means wherein the teeth thereof project through such opening and into contact with the film and a position relatively remote from said means wherein said member is positioned between the teeth of said means and the film, mechanism for driving said means, and sequential control mechanism interconnecting said driving mechanism and said movable member and effective for rendering said driving mechanism operative and inoperative upon said toothed means in timed relation to the movement of said member.

28. In a film handling apparatus having a feeding means including an apertured gate, and a motor for driving said feeding means positioned on said apparatus below said gate, in combination, a lamp positioned for cooperation with the film at said aperture, a lamp house for said lamp, a support for said lamp house in the form of an air conducting tube terminating in said lamp house at one end and terminating at the other end adjacent the shaft of said motor, and a fan on said shaft for blowing air through said tunnel for cooling said lamp house.

29. In a film handling apparatus, a gate comprising a plurality of sections two of which are movable relatively to each other, a toothed member for feeding a film between said movable sections, one of said movable sections having openings through which said member may extend when feeding the film, and sequential operating means effective for moving said movable sections into a first position wherein said sections are disposed in cooperative relation whereby a path is defined therebetween through which the film may be fed, said first position being such that said toothed member extends within said path, or into a second position wherein said movable sections are disposed in relatively distant relation one to the other whereby a film may be inserted into or removed from the space therebetween, or into a third position wherein one of said movable sections traverses said film feeding path and is disposed between the field of operation of said toothed member and said other mentioned movable section whereby it protects the film from the teeth of said feeding member.

30. In a film handling apparatus, a gate comprising a plurality of sections two of which are movable relatively to each other, a toothed member for feeding a film between said movable sections, one of said movable sections having openings through which said member may extend when feeding the film, sequential operating means effective for moving said movable sections into a first position wherein said sections are disposed in cooperative relation whereby a path is defined therebetween through which the film may be fed, said first position being such that said member extends within said path, or into a second position wherein said movable sections are disposed in relatively distant relation whereby a film may be inserted into or removed from the space therebetween, or into a third position wherein one of said movable sections traverses such path and is disposed between the film engaging work field of said toothed member and said other mentioned movable section whereby it protects the film from the teeth of said feeding member, said operating means including mechanism interconnecting said sections so that they are moved into the above mentioned positions in the sequence in which such positions are herein recited.

31. In a film handling apparatus, a toothed member for feeding a film, a gate comprising a plurality of sections, two of which are movable relatively to each other, one of said movable sections being normally positioned adjacent said toothed member and having openings through which said toothed member may extend, and sequential operating means effective for moving said movable sections into a first position wherein said movable sections are disposed in cooperative relation whereby a path is defined therebetween through which the film may be fed, said first position being such that said toothed member extends through said openings in said section into said path, and said other movable section holds the film in driven relation with said member, or into a second position wherein said movable sections are disposed in relatively distant relation whereby a film may be inserted into or removed from the space therebetween, or into a third position wherein said first mentioned section traverses said film path and is disposed between the work field of said toothed member and said other mentioned section whereby it protects the film from the teeth of said member.

32. In a sectional gate for use with a film handling apparatus, a first section, said section intersecting an optical axis of the apparatus, a mounting for said first section, a second section, and a pivotal mounting therefor, said sections being normally disposed in a cooperative film feeding relation, said first section and mounting therefor being so constructed that said section is movable, in a direction parallel to such optical axis away from said film feeding position, toward or away from said second section, and said second section and said mounting therefor being so constructed that said second section is movable angularly about its pivot toward said first section when the same is disposed in its position away from said film feeding position.

33. In a film handling apparatus, a support, a plane gate section extending from one side of said support at approximately a right angle thereto and intersecting an optical axis of the apparatus, a mounting for said section, said section and said mounting therefor being so arranged that said section is movable in a direction along such optical axis, a mounting member extending from the same side of said support parallel to said first mentioned section, a second plane gate section pivotally disposed upon said mounting member for movement to a position wherein it is disposed obliquely to such optical axis, and operating mechanism interlocking said sections and effective for moving said sections in one direction and into cooperative and parallel relation with each other whereby a work path through which a film may be fed at substantially right angles to said optical axis is defined therebetween or for moving said sections in the other direction whereby said second section is obliquely disposed to said optical axis and traverses such work path.

34. In a film handling apparatus, film feeding mechanism, control means for rendering said mechanism effective or ineffective, a gate through which a film is fed, said gate comprising a plurality of sections each movable relatively to the others, one of said sections being effective upon the movement thereof in one direction to position the film in operative relation to said feeding mechanism and another of said sections being effective upon movement thereof in an opposite direction from the movement of said first named section bodily to remove the film from said feeding mechanism, and mechanism interlocking said sections and said control means, said mechanism being effective for moving said sections and for operating said control means in cooperation with the movements of said sections to dispose the film in the desired relation to said feeding mechanism.

35. In a film handling apparatus, revoluble film carriers, a film-path-defining gate therebetween, means operable for opening or closing said gate, means for applying power to one of said carriers whereby a film supported upon the other of said carriers is moved therefrom rapidly through said gate and wound upon said first mentioned carrier, said gate being held in open position by said gate operating means, braking means for at least one of said carriers, and sequential control means interlocking said means for opening or closing said gate, said means for applying power to said carrier and said braking means, said control means applying power to said braking means temporarily before operating said gate operating means so that the speed of said film is decreased before said gate is opened or closed.

36. In a film handling apparatus, revoluble film carriers, a film-path-defining gate therebetween, means operable for opening or closing said gate, means for applying power to one of said carriers whereby a film supported upon the other of said carriers is moved therefrom rapidly through said gate and wound upon said first mentioned carrier, braking means for at least one of said carriers, and sequential control means interlocking said means for opening or closing said gate, said means for applying power to said carrier, and said braking means, said control means first rendering said means for applying power to said carrier inoperative and rendering said braking means temporarily operative next, and thereafter closing said gate, whereby the movement of the film is decreased before said gate is closed on the film.

37. In a film handling apparatus, revoluble carriers for a film extending therebetween, a film-path-defining openable gate disposed between said carriers through which the film passes, means for closing said gate, braking means for at least one of said carriers, and sequential control means interlocking said means for closing said gate and said braking means, said control means being necessarily operative to reduce the speed of the film through said gate before the same is closed.

38. In a film handling apparatus, two revoluble carriers for a film extending therebetween, means for revolving one of said carriers rapidly, an openable gate disposed between said carriers and defining a portion of the path of the film, means for closing said gate preparatory to feeding the film therethrough more slowly for projecting pictures from the film, braking means for said rapidly revolving carrier, and sequential control means interlocking said means for closing said gate and said braking means for first rendering said braking means operative and thereafter for operating said means for closing said gate.

39. In a film handling apparatus, two revoluble film carriers, a film-path-defining openable gate between said carriers, means for operating said gate, means for revolving one of said carriers and feeding a film from the other of said carriers through said gate, braking means for at least one of said revolving carriers, and sequential control means interlocking all of said means for the purpose set forth.

40. In a film handling apparatus, a revoluble delivery carrier, a revoluble take-up carrier, braking means for at least one of said carriers, a source of power, means for applying said source of power to said take-up carrier whereby a film supported by said delivery carrier is wound upon said take-up carrier, means for applying said source of power to said delivery carrier whereby a film supported upon said take-up carrier is re-wound therefrom upon said delivery carrier, and sequential means interlocking all of said previously mentioned means and being operative to apply said braking means to said delivery carrier after rendering inoperative said means for applying said source of power to said delivery carrier and to release said braking means before rendering operative said means for applying said source of power to said take-up carrier.

41. Apparatus for the feeding of film, comprising two revoluble carriers, an openable film-path-defining gate positioned therebetween, means for opening or closing said gate, means for operating one of said carriers whereby the film is fed in one direction between said carriers through said gate at relatively low speed for projecting pictures, said gate being closed, means for operating the other of said carriers whereby the film is fed in the other direction between said carriers through said gate at relatively high speed for rewinding the film while said gate is open, braking means for said high speed carrier to reduce the speed of the same preparatory to changing the direction of the film movement, and a single sequential control means interlocking all of said means.

42. Apparatus for the feeding of film, comprising two revoluble carriers, an openable film-pathdefining gate positioned therebetween, means for opening or closing said gate, means for operating one of said carriers whereby the film is fed in one direction between said carriers through said gate at relatively low speed for projecting pictures while said gate is closed, means for operating the other of said carriers whereby the film is fed in the other direction between said carriers through said gate at relatively high speed for rewinding the film while said gate is open, braking means for at least said high speed carrier, and sequential control means interlocking all of said previously mentioned means and being effective thereon so that first said means for opening or closing said gate is operated for opening said gate and thereafter said high speed operating means is actuated; second said high speed operating means is rendered inoperative, said braking means is rendered operative, and said means for opening or closing said gate is operated for closing said gate; and third said braking means is rendered inoperative and said low speed operating means is rendered operative.

43. In a film handling apparatus, a spindle, means for mounting said spindle upon said apparatus for axial movement to a plurality of positions thereupon, toothed means for feeding the film supported upon said spindle, said toothed means having a single operative mounting on said apparatus, means cooperating with said feeding means and operated by the film for controlling the rate of rotation of said spindle and the delivery of the film therefrom, and devices rendering said controlling means operative irrespective of the position of said spindle.

44. In a film handling apparatus, an adjustable spindle carriage, a spindle mounted upon said carriage, a driving member therefor mounted upon said carriage, a clutch for operatively connecting or disconnecting said member and said spindle mounted upon said carriage, a control member for said clutch mounted upon said apparatus, and mechanism effective in a plurality of positions of said carriage for operatively connecting said clutch and said member, said mechanism including a rotatable operating shaft of noncircular cross section connected to said clutch, a formation with an opening of a similar cross section through which said shaft is movable, and means connecting said control member and said formation whereby the movement of said control member rotates said formation whereby said formation rotates said shaft, irrespective of the position thereof within said opening, and operates said clutch.

45. Film feeding apparatus, comprising a gate through which a film passes, means to move the film through said gate in a feeding or rewinding direction, means to place the portion of the film within said gate under tension while the film is being moved in one direction, means to remove said tension upon the portion of the film within said gate while the film is being moved in another direction, means movable relatively to the film and to said gate to lock the film against lateral movement relative to said gate while the film is being moved in said second mentioned direction, and means to move said locking means into locking position.

46. In a film handling apparatus, a gate comprising sections parallel to each other and to the path of travel of a film therebetween, means to move one of said sections into relatively close relation to another section, means to move the film between said sections while said sections are in such relatively close relation to each other, means to move one of said sections into relatively distant relation to another section, means to move the film between said sections while said sections are in such relatively distant relation, movable means to lock the film against movement lateral to its path of travel through said gate when said film is moved between said sections while said sections are in relatively distant relation to each other, and means interconnecting said movable locking means and said movable gate section for causing the movement of said locking means to locking position upon the movement of said movable gate section.

47. In a film handling apparatus, a gate, means for intermittently moving a film through said gate, alternatively operable means for continuously moving the film through said gate, movable means movable to a position wherein it engages an edge of the film for locking the film in the gate against lateral movement, means for moving said means to said position, and means for maintaining said locking means in locking position during the operation of said means for continuously moving the film through said gate.

48. In a film handling apparatus, a rewinding spindle, a take-up spindle, an operable gate disposed therebetween, said gate intersecting the optical axis of the apparatus, means to feed a film through said gate from said rewinding spindle to said take-up spindle, means to rewind the film through said gate while said gate is open from said take-up spindle to said rewinding spindle, a movable member movable to a position wherein it is disposed parallel to the optical axis of the apparatus and engages a side edge of the film to lock the film against movement lateral to said gate, means for moving said locking member to locking position, mechanism for maintaining said locking member in locking position while said gate is open, and sequential control mechanism interlocking all of said means and including devices for successively operating each of said means.

49. A film handling apparatus comprising rotatable carriers between which a film extends, a first means for applying power to a first of said carriers for rotating said first carrier in a feeding direction so that the film supported upon the second of said carriers is moved from said second carrier and wound upon said first carrier, a second means for applying power to said second carrier for rotating said second carrier in a rewinding direction so that the film previously wound upon said first carrier is wound therefrom and rewound upon said second carrier, means to operate said first and second power-applying means successively, braking means effective for checking the rotation of said carriers, and control means interlocking both of said power-applying means, and said braking means and including devices for rendering said braking means effective upon said carriers after the operation of said second power-applying means and before the operation of said first power-applying means and rendering said braking means ineffective during the succeeding operation of said first power applying means.

50. A film handling apparatus comprising rotatable film supporting carriers between which a film extends, means for applying power to one of said carriers for rotating said carrier so that the film supported upon said other carrier is moved from said other carrier and wound upon said power-rotated carrier, operable braking means effective for checking the rotation of said carriers, and control means interlocking said power-applying means and said braking means and including devices for maintaining said braking means without operative effect upon said carriers during the period during which said power-applying means is effective to drive said power-rotated carrier and for substantially simultaneously rendering said power-applying means ineffective upon said power-rotated carrier and initiating the operation of said braking means upon said power-rotated carrier whereby the momentum thereof is checked.

51. In a film handling apparatus, a spindle for a film carrier, a support for said spindle mounted upon said apparatus and movable thereon to a plurality of different operative positions for use with different sizes of film carriers, means for rotating said spindle, and means for governing the rate of rotation of said spindle, said governing means including an actuating member mounted upon said apparatus, a spindle engaging member mounted upon said support, and adjustable connections between said actuating member and said spindle engaging member for operating said spindle engaging member irrespective of the position of said support upon said apparatus.

52. In a film handling apparatus, a gate, means for opening said gate, a toothed member for feeding a film through said gate, means for removing the film from the teeth of said member, and sequential control mechanism, said sequential control mechanism including movable actuating means and connections between said actuating means and said gate and said removing means for opening said gate upon a first portion of the movement of said actuating means and maintaining said removing means in inoperative position during such first portion of such movement and thereafter for operating said removing means upon a succeeding portion of the movement of said actuating means.

53. In a film handling apparatus, a gate, means for opening said gate, a toothed member for feeding a film through said gate, means for removing the film from the teeth of said member, and sequential control mechanism, said sequential control mechanisms including three control positions, an actuating member movable between said positions, and connections between said actuating member and said gate for opening said gate upon the movement of said actuating member from said first to said second position and connections between said actuating member and said removing means for operating said removing means upon the movement of said actuating member from said second to said third position.

54. In a film handling apparatus, a gate, said gate comprising a first and second oppositely disposed film engaging section, each movable relatively to the other, defining therebetween a path through which a film may be fed, a toothed member disposed adjacent the first of said sections and extending into said path for feeding the film therealong, means for moving the second of said sections away from the first of said sections and maintaining said first section motionless, and means for thereafter moving said first section in the same direction a distance sufficient to position it between said path and the teeth of said feeding member.

55. In a film handling apparatus, a gate comprising a plurality of film path-defining sections including a film protecting section, toothed means for feeding a film between said protective section and another of said sections in a projecting direction, means for moving said protecting section to a position wherein it protects the film from the teeth of said means, and sequential control mechanism interlocking said feeding means and said moving means and including devices for first rendering said feeding means ineffective and thereafter operating said moving means to move said protecting section to protective position.

56. In a film handling apparatus, a gate, said gate including a section which is movable relatively to another section thereof to a position wherein said sections are disposed in relatively distant relation one to the other, means for moving said movable section to said position, a movable locking member movable relatively to a film disposed between said sections and to both said sections of said gate to a position wherein it locks the film against lateral movement, means for maintaining said member in said locking position while said sections are disposed in said relatively distant position, means for rewinding the film through said gate while said sections are disposed in said distant position, and control mechanism interlocking said means for moving said gate section and said rewinding means and effective for operating both of said means.

57. In a film handling apparatus, an operable gate, means for feeding a film therethrough, means for rewinding the film therethrough, said means being successively operable, means movable relatively to the film and to said gate to one position wherein it locks the film within said gate against lateral movement relatively thereto and to another position relatively distant from said first position wherein it is without effect upon the film, sequential control mechanism interlocking said feeding means, said rewinding means, and said gate, and including devices for closing said gate prior to said feeding movement of the film and for opening said gate prior to the succeeding rewinding movement of the film, and means for maintaining said locking means operative in said first or locking position during both of said film movements.

58. Apparatus for the feeding of material, comprising two revoluble carriers between which a ribbon of material extends, means for operating one of said carriers at a relatively low speed whereby the material wound upon the other carrier is drawn therefrom and wound upon said first mentioned carrier at a relatively low speed, means for operating the other of said carriers at a relatively high speed but in the reverse direction whereby the material is moved from the first carrier and rewound upon the other carrier at a relatively high speed, operable braking means effective upon said carriers, and control mechanism interlocking all of said means and including devices for first rendering said high speed operating means ineffective and applying said braking means and second rendering said braking means ineffective and rendering said low speed operating means effective to operate said other carrier.

59. In a film handling apparatus, a spindle for a film carrier, a support for said spindle mounted upon said apparatus and movable thereon to a plurality of different operative positions for use with different sizes of film carriers, driving mechanism for said spindle mounted upon said apparatus, means operative irrespective of the position of said support for operatively connecting said spindle and said mechanism whereby said spindle is rotated by said mechanism, and means for modifying the rotation of said spindle, said modifying means comprising a movable film engaging member mounted upon said apparatus, spindle engaging means mounted upon said support, and an operating connection between said film engaging member and said spindle engaging means effective to operate said spindle engaging means by the movement of said film engaging member irrespective of the position of said support upon said apparatus.

60. In a film handling apparatus, toothed means for feeding a film, a film-engaging member positioned between the film and said means, said member including an opening through which the teeth of said means may project into operative relation with the perforations of the film, a movable mounting for said member, means for moving said member upon said mounting from a position relatively adjacent said means wherein the teeth thereof project through such opening and into contact with the film and a position relatively remote from said means wherein said member is positioned between the teeth of said means and the film, mechanism for driving said means, and sequential control mechanism interconnecting said driving mechanism and said movable member and effective for rendering said driving mechanism inoperative and operative upon said toothed means in timed relation to the movement of said member.

61. In a film handling apparatus, an adjustable spindle carriage, a spindle mounted upon said carriage, a driving member therefor mounted upon said carriage, a clutch for operatively connecting and disconnecting said member and said spindle mounted upon said carriage, a control member for said clutch mounted upon said apparatus, and mechanism including adjustable connections operable in a plurality of positions of said carriage for operatively connecting said clutch and said member whereby said clutch may be operated by said member irrespective of the position of said carriage upon said apparatus.

62. In a film handling apparatus, an adjustable spindle carriage, a spindle mounted upon said carriage, means for rotating said spindle, and mechanism effective in a plurality of positions of said carriage for governing the rate of rotation of said spindle, said mechanism including a control member mounted upon said carriage and effective for governing the rate of rotation of said spindle, a rotatable operating shaft of non-circular cross section connected to said control member for operating said control member, a formation with an opening of a similar cross section through which said shaft is movable, a movable actuating member mounted upon said apparatus, and means connecting said actuating member and said formation whereby the movement of said actuating member rotates said shaft, irrespective of the position thereof within said opening, and operates said control member.

63. In a film handling apparatus, an adjustable spindle carriage, a spindle mounted upon said carriage, means for rotating said spindle, and mechanism effective in a plurality of positions of said carriage for governing the rate of rotation of said spindle, said mechanism including movable operating means effective for governing the rate of rotation of said spindle, said operating means including an elongated extension and being mounted upon said carriage for movement therewith, a movable control member mounted upon said apparatus, and an element operated by the movement of said control member which contacts and operates said elongated extension thereby operating said operating means irrespective of the position of said element along the surface of said elongated extension.

BARTON ALLEN PROCTOR.